United States Patent [19]

Kanagy

[11] Patent Number: 4,583,451
[45] Date of Patent: Apr. 22, 1986

[54] APPARATUS FOR AUTOMATICALLY COOKING PRODUCTS MADE OF BATTER, SUCH AS PANCAKES

[76] Inventor: Jonas J. Kanagy, Rte. 1, Box 122, Stuarts Draft, Va. 24477

[21] Appl. No.: 630,380

[22] Filed: Jul. 12, 1984

[51] Int. Cl.[4] ............................................. A47J 37/10
[52] U.S. Cl. ...................................... 99/423; 99/395; 99/443 C; 99/446; 198/403; 222/358
[58] Field of Search .................. 99/443 C, 395, 446, 99/423, 424, 386, 353, 334; 222/332, 356, 357, 442, 363, 366, 358; 198/403; 426/523

[56] References Cited

U.S. PATENT DOCUMENTS

| | | |
|---|---|---|
| 463,073 | 11/1891 | Noakes et al. . |
| 580,753 | 4/1897 | Barnard . |
| 1,137,128 | 4/1915 | Geyer . |
| 1,524,922 | 2/1925 | Formaneck . |
| 1,632,614 | 6/1927 | Mickelson et al. . |
| 1,809,004 | 6/1931 | Vierling et al. . |
| 1,847,752 | 3/1932 | Coleman . |
| 1,912,765 | 6/1933 | Erni . |
| 2,571,344 | 10/1951 | Dashwood . |
| 2,584,584 | 2/1952 | Hoffman .......................... 99/386 X |
| 2,891,465 | 6/1959 | Rogge . |
| 2,899,914 | 8/1959 | Van Arsdell . |
| 2,935,236 | 5/1960 | Mueller . |
| 3,097,588 | 7/1963 | DeJersey ........................ 99/423 X |
| 3,215,062 | 11/1965 | Frankenberg . |
| 3,225,716 | 12/1965 | Krooss et al. . |
| 3,410,198 | 11/1968 | Lohr et al. . |
| 3,427,956 | 2/1969 | Jaffe . |
| 3,457,853 | 7/1969 | Morley . |
| 3,718,487 | 2/1973 | Brunner . |
| 3,795,183 | 3/1974 | Roth et al. . |
| 3,952,643 | 4/1976 | Wolfelsperger et al. . |
| 4,007,368 | 2/1977 | Jensen ............................ 99/386 X |
| 4,176,589 | 12/1979 | Stuck ................................. 99/386 |
| 4,208,441 | 6/1980 | Westover . |
| 4,213,380 | 7/1980 | Kahn . |
| 4,241,648 | 12/1980 | Longenecker .................. 99/423 X |
| 4,295,418 | 10/1981 | Lang-Ree . |

Primary Examiner—Billy J. Wilhite
Attorney, Agent, or Firm—Lowe, King, Price & Becker

[57] ABSTRACT

Products made of batter, such as pancakes, are automatically cooked on a continuous elongated, continuously advanced heated conveyor belt. A dispenser adjacent one end of the belt dispenses individual masses of the batter onto the belt to form the individual product units. At an intermediate location along the belt length, the product units are flipped. The dispenser and flipper are activated in synchronism with each other and longitudinal movement of the belt in response to the belt being continuously advanced.

37 Claims, 30 Drawing Figures

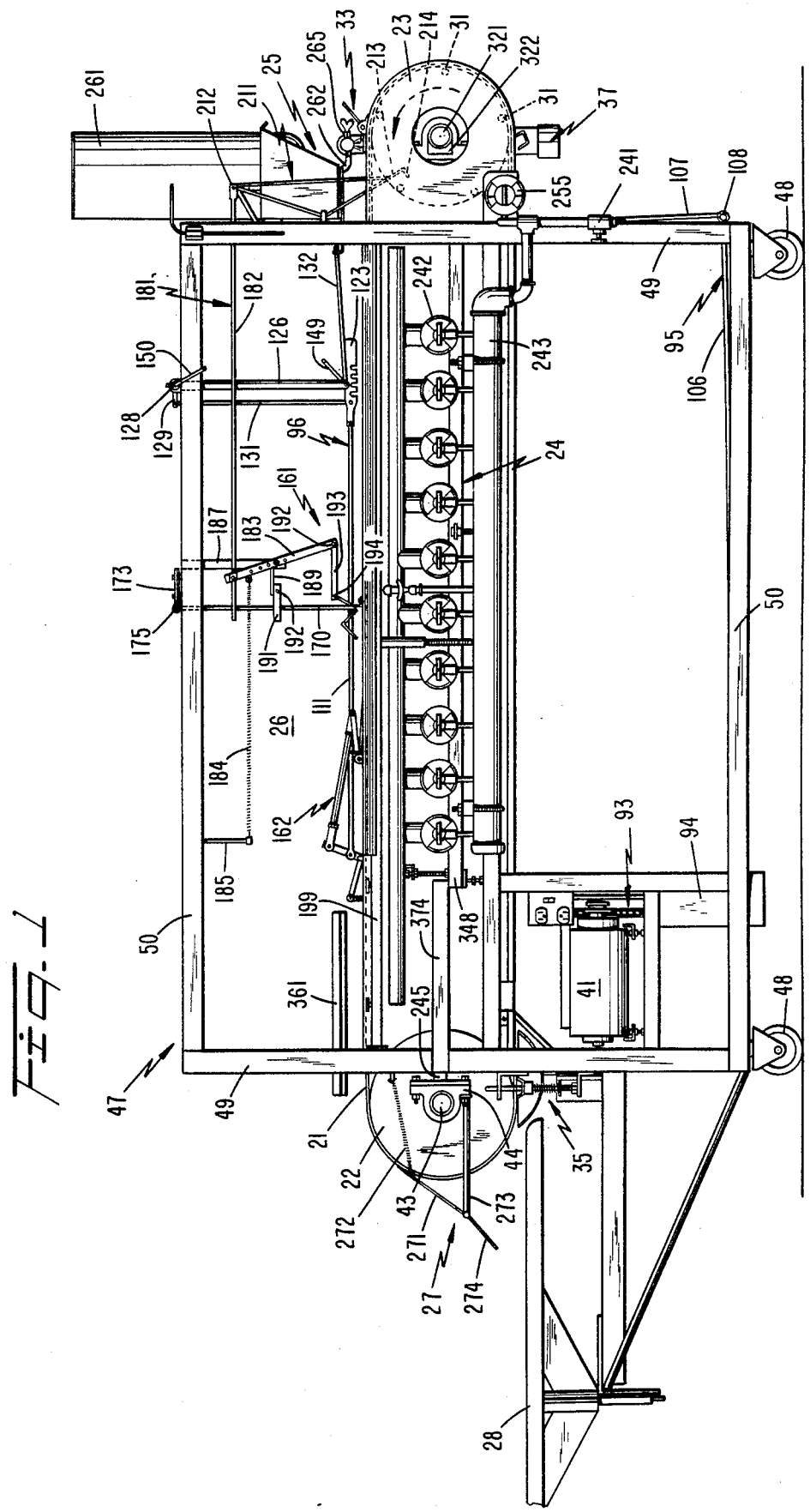

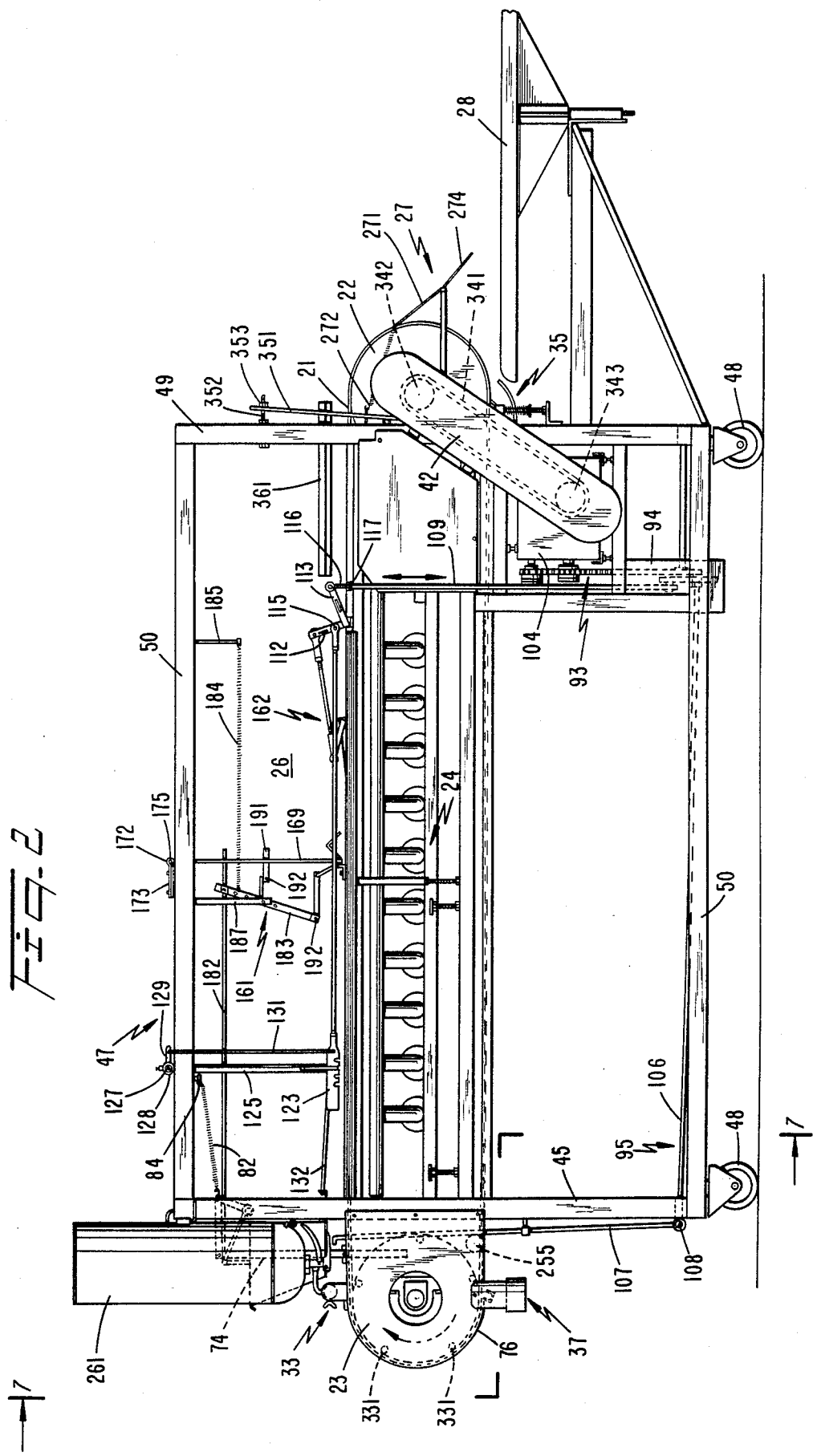

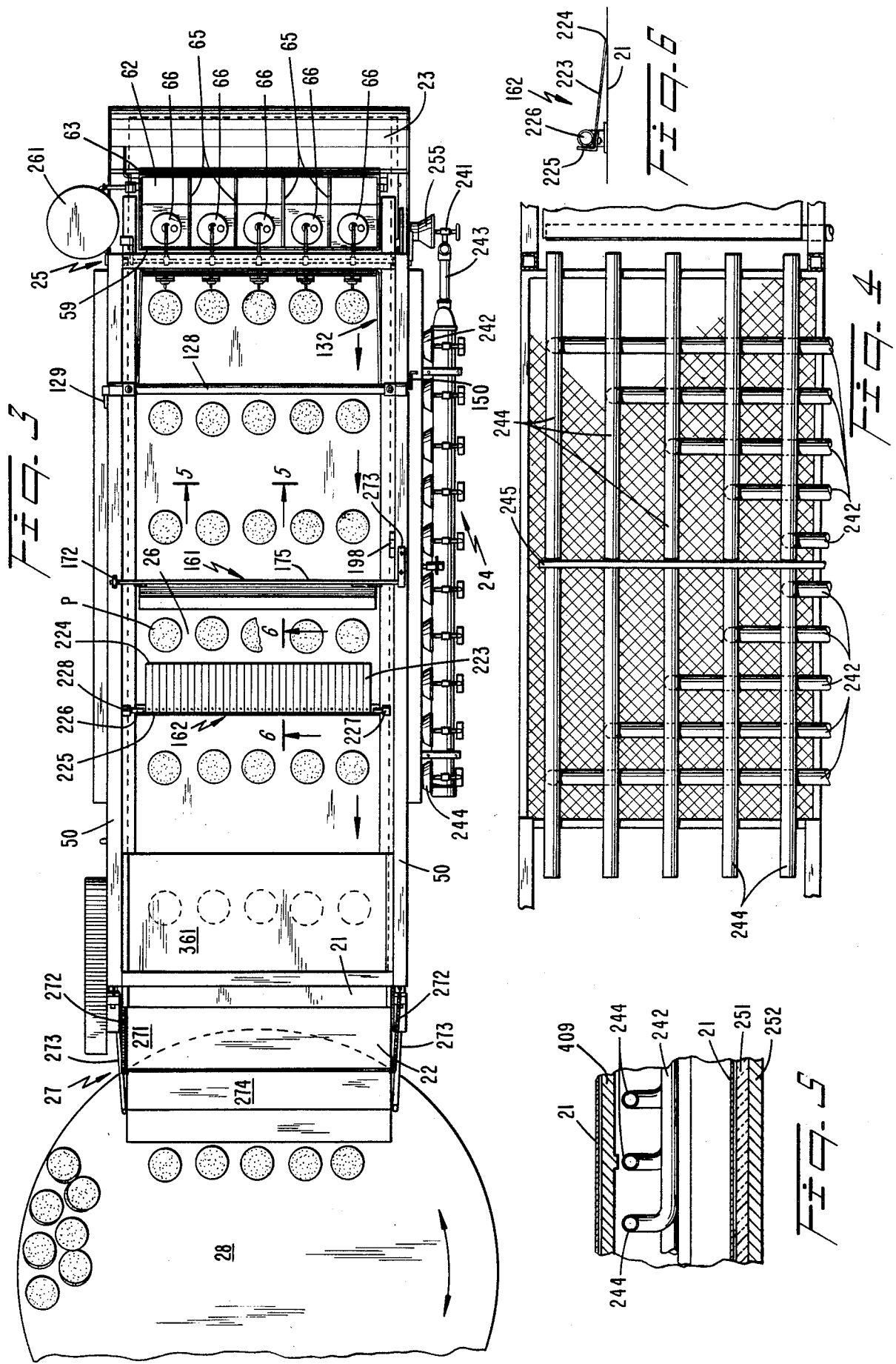

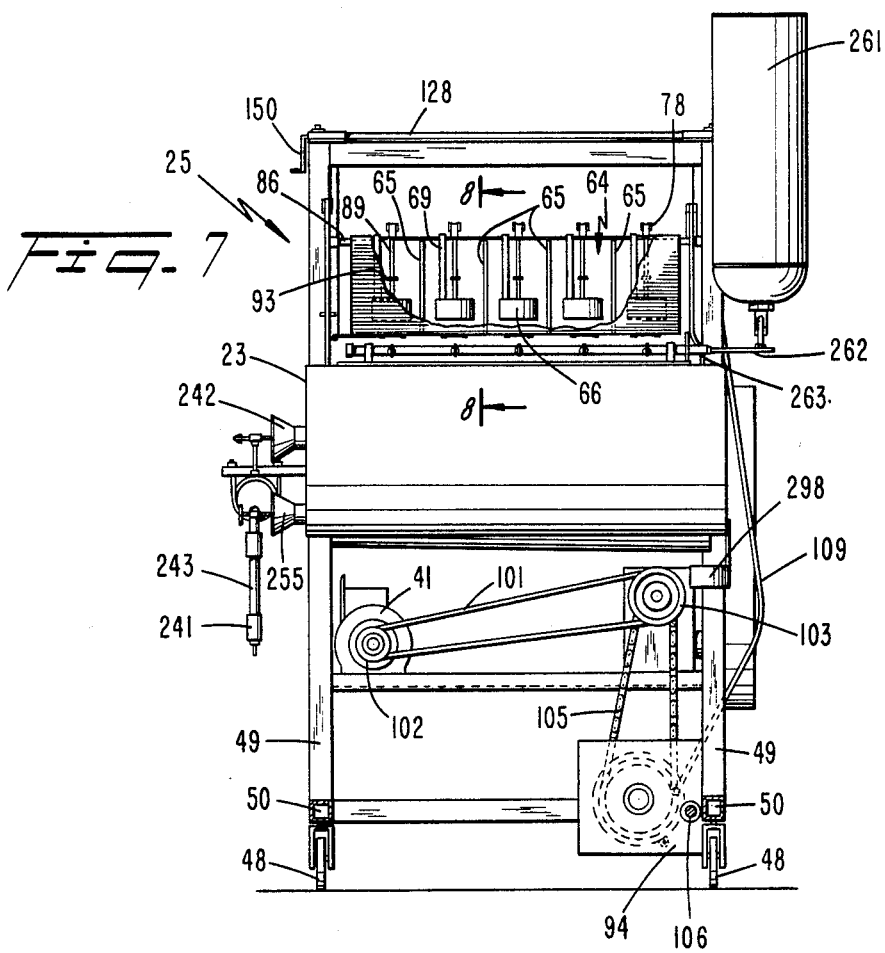
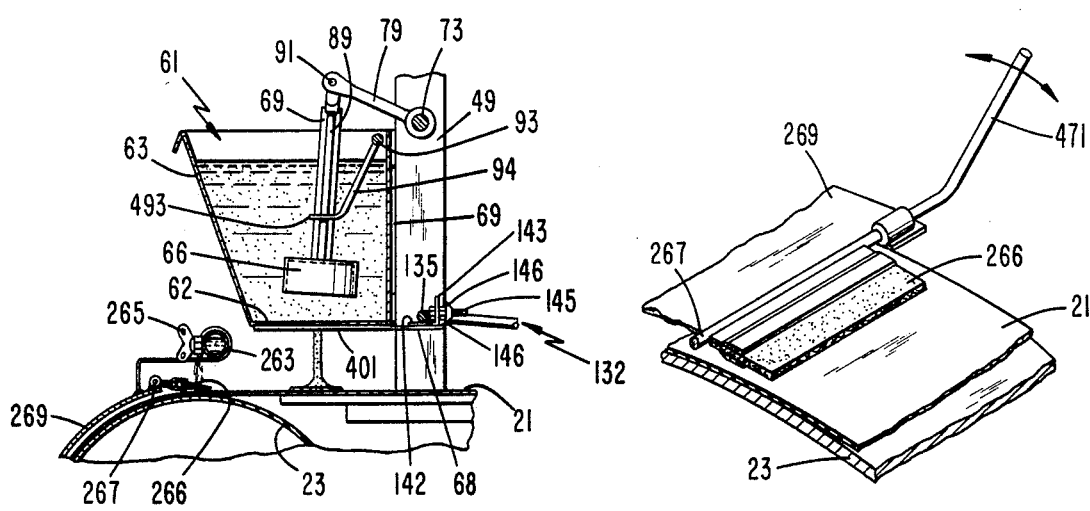

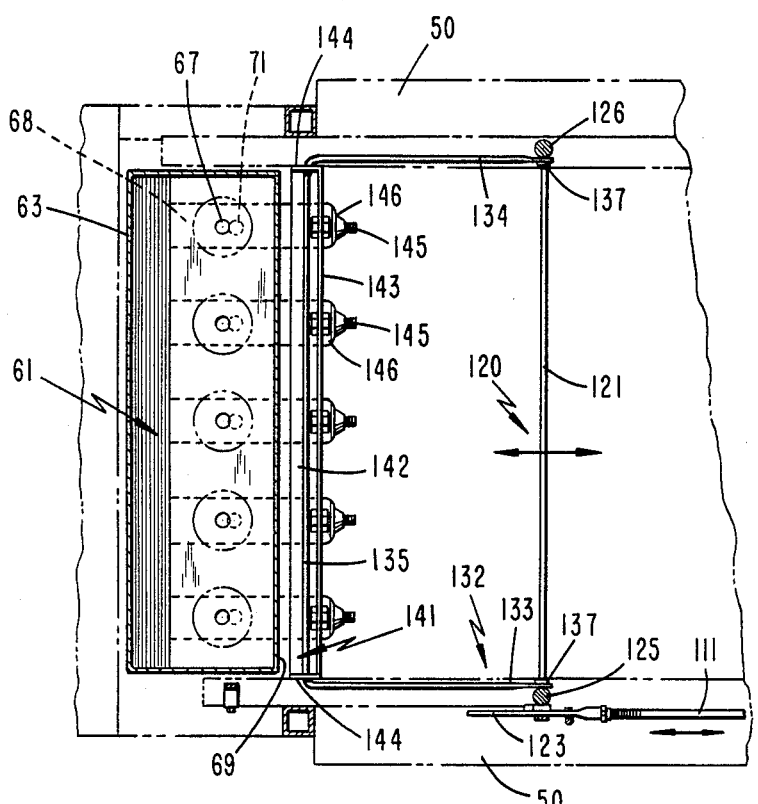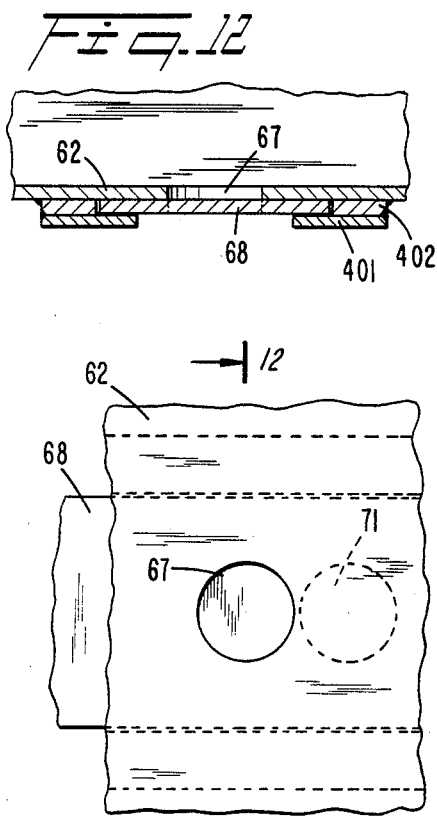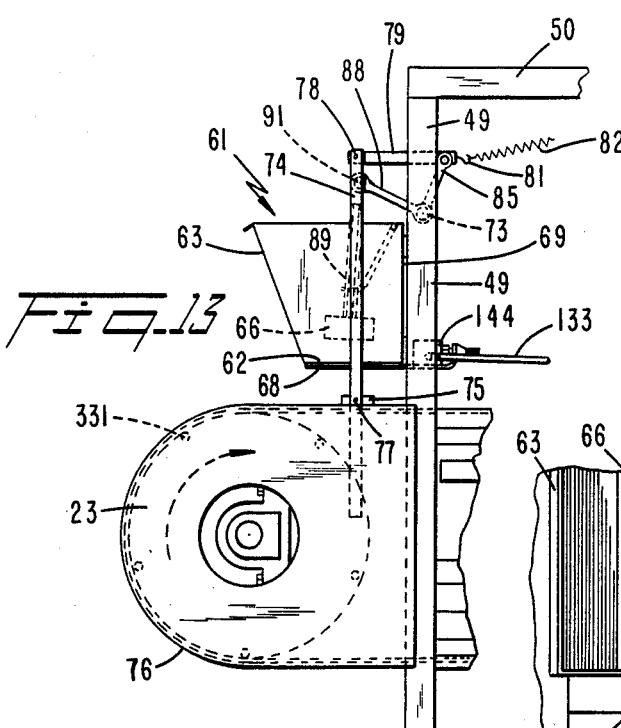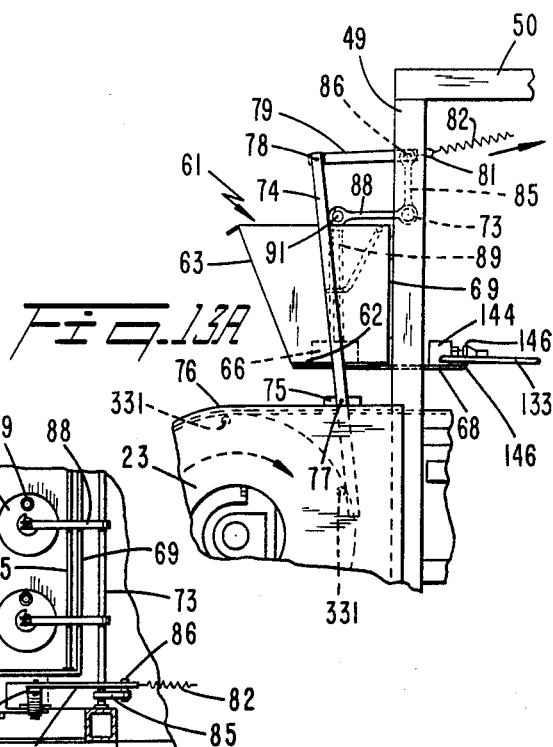

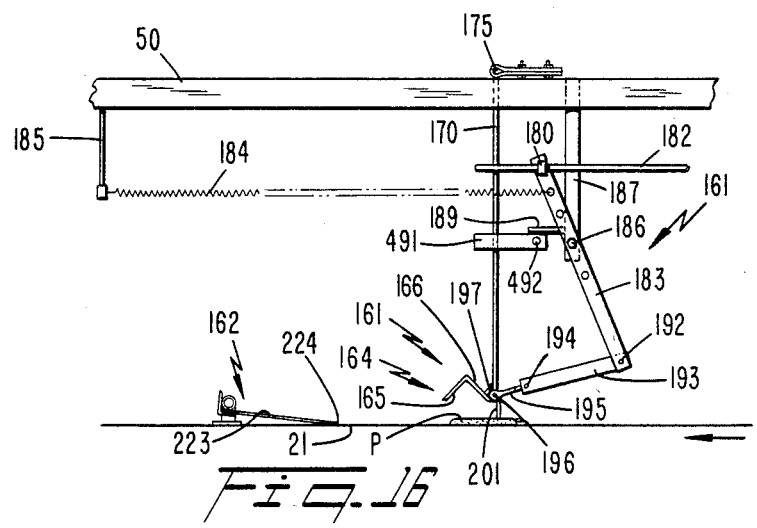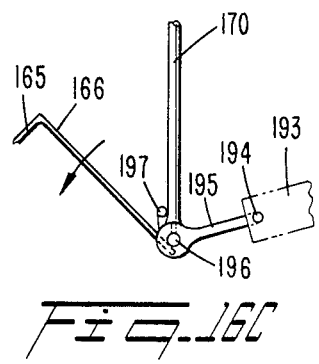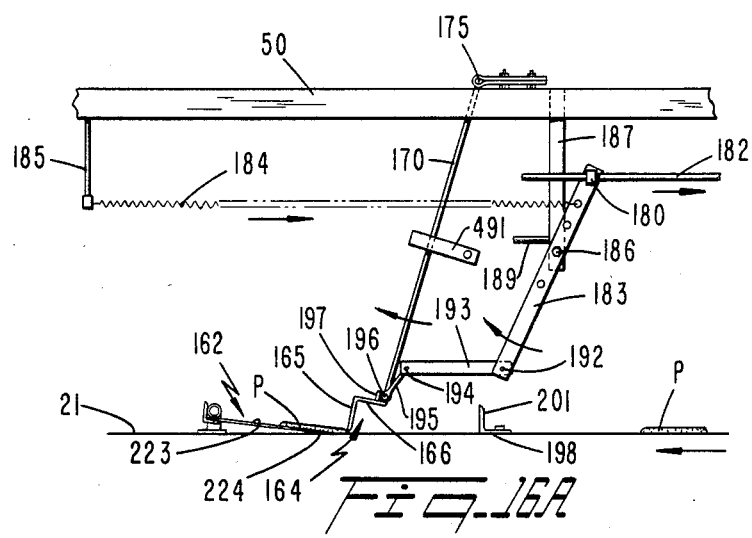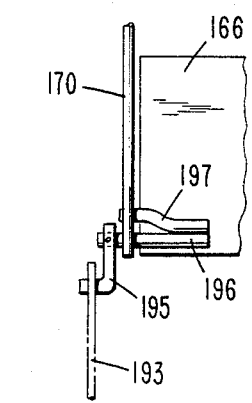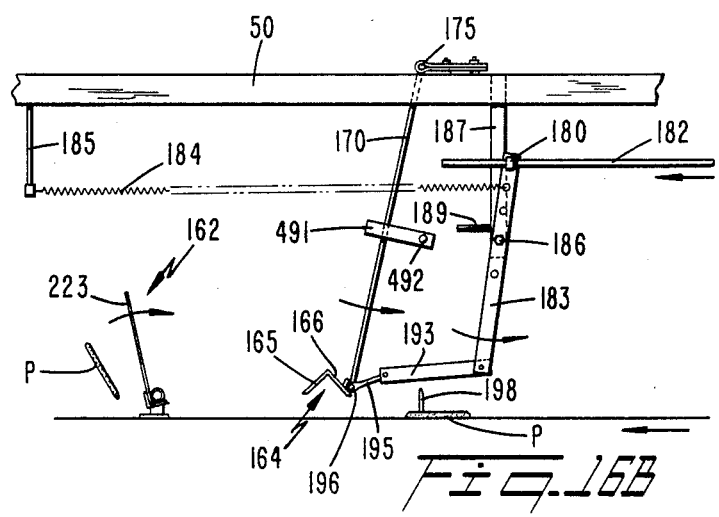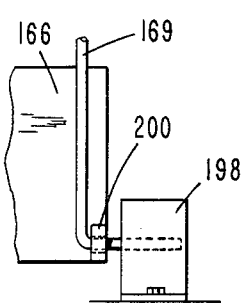

4,583,451

APPARATUS FOR AUTOMATICALLY COOKING PRODUCTS MADE OF BATTER, SUCH AS PANCAKES

TECHNICAL FIELD

The present invention relates to apparatus for automatically cooking products made of batter, such as pancakes, and more particularly to such an apparatus that includes a continuous elongated, continuously advanced heated conveyor belt, the movement of which activates a dispensing means and a flipping means in synchronism with each other and the belt movement. In accordance with a further aspect, the invention is related to a batter dispenser and more particularly to a batter dispenser including pressurized inverted cups that are driven in a batter containing hopper having selectively opened batter passages.

BACKGROUND ART

Numerous machines have been previously suggested for automatically cooking products made of batter, such as pancakes. However, to my knowledge, none of these prior art suggested machines have been commercially adapted. The previously suggested art machines have a low throughput and/or are relatively complex.

Coleman, U.S. Pat. No. 1,847,752 and Vierling et al U.S. Pat. No. 1,809,004 disclose relatively low capacity machines having heated turn tables responsive to batter from hoppers. After the batter has been heated on one side while on the turning turn table, the batter is flipped over to the other side. After the batter has been cooked on the other side, the cooked griddle or pancake must be removed from the turn table, usually by a lifting mechanism of some type.

Increased through put is attained with the automatic griddle or pancake baking machines disclosed by each of VanArsdell, U.S. Pat. No. 2,899,914, and Brunner, U.S. Pat. No. 3,718,487. In both of these references, there is a linearly moving belt formed by a series of separate griddle plates. In VanArsdell, the griddle plates are indexed, i.e., moved in step-by-step manner, through a distance equal to the distance between the center lines of adjacent griddle plates. Downstream of the dispensing station in each of these prior art machines, there is a flipping mechanism. In VanArsdell, the pancakes are flipped by a spatula which removes the pancakes from a turned side of the indexed plates, causing the pancakes to drop onto a second belt formed of plates. In the Brunner device, the cakes are removed from the griddle plates by a transversely directed knife prior to the plates entering a flipping station, where the pancakes are flipped from one plate to another. These separate griddle plate mechanisms are relatively complex and expensive. In addition, the likelihood of flawless flipping appears to be somewhat low.

Krooss et al U.S. Pat. No. 3,225,716 discloses a griddle cake cooking apparatus wherein batter is dispensed from a hopper onto a first conveyor belt. The cakes are cooked on one side while on the first belt. The cakes slide along an inclined portion of the first belt onto a second belt positioned below the first belt. The cakes are supposed to be flipped as they move from the first belt to the second belt. The cakes, after having been cooked on the opposite side on the second belt, fall to a plate, below the end of the second belt. Both belts are greased by rollers located in greased dispensers. Immediately below the inclined plane portion of the first belt and immediately below the point where cakes are removed from the second belt are scraper blades. To flip the griddle cakes, the inclined portion of the first belt is shifted from a left to right inclination angle to a right to left inclination angle. It appears that such a flipping structure is complex, subject to failure, and unreliable. To provide correct synchronization, Krooss et al finds it necessary to provide simultaneous step wise movement of the first and second conveyor belts. It would appear that step wise motion of the conveyor belts is likely to cause a strain on them and more rapid wearing of the drive mechanisms for them than would be the case for a continuously advanced conveyor belt.

It is accordingly, an object of the present invention to provide a new and improved apparatus for automatically cooking products made of batter, such as pancakes.

Another object of the present invention is to provide a new and improved apparatus for automatically and reliably cooking batter products, such as pancakes, wherein a continuously advanced, elongated conveyor belt is provided on which the pancakes are cooked.

A further object of the invention is to provide a new and improved apparatus for automatically cooking batter products, such as pancakes, which apparatus is relatively reliable, inexpensive and capable of very high throughput.

DISCLOSURE OF THE INVENTION

In accordance with one aspect of the invention, an apparatus for automatically cooking products made of batter, such as pancakes, comprises a continuous, elongated, continuously advanced conveyor belt in combination with means for dispensing individual masses of batter onto the belt to form individual units of the product. The dispensing means is located adjacent one end of the belt. Sufficient heat is supplied to the belt to cook the batter masses dispensed from the dispensing means onto the belt. Means are provided for flipping the individual product units as they arrive at an intermediate location along the belt length so that one side of each product unit is cooked on the belt upstream of the means for flipping and another side of each product unit is cooked on the belt downstream of the means for flipping. A mechanism responsive to the continuous belt advancement activates the dispensing means and the flipping means in synchronism with each other and longitudinal movement of the belt.

By utilizing a continuous, elongated, continuously advanced belt, the device has enormous throughput. In one embodiment wherein plural rows of products are simultaneously cooked, the machine has been able to make 1,200 pancakes per hour. The device is relatively simple, with the conveyor belt and drive mechanism therefor requiring relatively little maintainance. I have found that by synchronizing the dispensing means and the flipping means in response to the continuous belt advancement, rather than in response to a drive for the belt, more accurate synchronized operation occurs. This is because of slippage between the drive for the belt and the belt advancement. Such slippage has a tendency to prevent proper synchronism between the dispensing means, the flipping means and longitudinal belt movement.

Preferably, the belt passes over first and second drums, one of which is located at the first end of the belt, where the dispensing means is located. The second drum is at the other end of the belt, where a means for removing the cooked individual units is provided. The means for removing preferable includes an upwardly extending doctor blade continuously urged during removal of the product units against the belt at a location where the belt is paid about the second drum and below the second drum axis. I have found that such a doctor blade facilitates removal of the individual units from the belt so that the individal units easily fall by gravity onto a receiver for them. Preferable, the doctor blade includes a curved segment remote from the area where the doctor blade is urged against the belt to provide a skirt like structure over the units pass as they fall away from the drum in the direction of the movement along the belt.

I have found that the belt, which may be any standard cooking conveyor belt, has a tendency to change dimensions as it changes temperature during cooking of the units. In response to the temperature of the belt, the longitudinal separation of axes for the drums is changed to compensate for the dimensional changes of the belt so the belt remains taut on the drum despite the temperature changes the belt undergoes.

One of the drums is a driven drum while the remaining drum is an idler drum. The dispensing means and flipping means are activated in response to rotation of the idler drum induced therein by the belt passing over it; this effectively provides the previously mentioned accurate synchronism. The dispensing means and flipping means are activated by linkages coupled to and activated by pegs that rotate with and are driven by the idler drum. First and second linkages are respectively coupled between the pegs and activators for the dispensing means and an activator for the flipping means. The flipping means includes flipper fingers that are driven by a linkage coupled to the pegs. Upstream of the flipper fingers is a structure for pushing the product units onto the flipper fingers, which pushing structure is activated by still a further linkage coupled to the pegs.

Upstream of the means for dispensing is means for applying cooking oil to the belt. The cooking oil dispensing means includes wick means extending transversely of the belt. The wick means drops the cooking oil onto the belt from a position above the belt as the belt is being translated, whereby excessive heat is not applied to the wick while the machine is in operation. To prevent rust of the belt while the belt is not being heated and the device is in an inoperative condition, the wick is dropped onto the belt so the cooking oil lubricates the belt. To prevent excessive oil from being applied to the belt during the cooking operation, the previously mentioned doctor blade removes some excess oil from the belt. In addition, a further scraper is provided downstream of the doctor blade and is urged against the belt. A trough receives material removed by the scraper from the belt. The material in the trough flows by gravity into a container that is located at a low region of the trough so that material removed from the belt by the scraper means flows to the low region and thence to a container.

Preferably, particularly for product units that are pancakes, the heat supplying means is arranged to apply a greater quantity of heat to the belt while the belt advances from the means for dispensing to the flipping means than while the belt is advancing from the flipping means to the means for advancing. The heat supplying means is arranged in this way because considerably more than half of the heating is provided between the dispenser means and the flipping means. The heat applied to the product units downstream of the flipping means is primarily for browning the previously uncooked face of the product unit.

I have found that heating of the belt is enhanced by providing a separate heat source adjacent the drum at the end of the machine where the dispensing means is located. The heat source is in contact with the belt and is interposed between the belt and first drum (the drum adjacent the dispensing means) so that the belt is heated immediately before it is paid onto the first drum.

I have also found that the belt has a tendency to walk toward one end of one of the drums. To compensate for the walking tendency and maintain the belt straight on both drums, a shaft at one end of one drum is longitudinally translated relative to a shaft at the other end of said one drum.

In a preferred embodiment, the flipping means includes plural spring fingers disposed across the width of the belt. The spring fingers are turned together about a common axis that is located above the belt. The spring fingers are dimensioned and arranged to enable an end of each spring finger to be urged against the belt along a region extending substantially across the entire width of the belt. This structure is used because I have found that the belt does not remain in a horizontal plane at the intermediate position where the spring fingers are located, but has a tendency to become bowed when viewed from a transverse cross-section. The spring fingers thus remain in contact with belt to lift the pancakes at all transverse pelt positions despite the tendency for the belt to become curved in the intermediate region.

The fingers are turned from a first position where the ends thereof are normally urged against the belt and wherein the finger ends point toward the dispensing means to a second position that is beyond the vertical and wherein the finger ends point away from the dispensing means. The fingers are turned about the common axis therefor from the first position toward the second position as the product units reach the fingers.

Immediately upstream of where the finger ends engage the belt while the fingers are in the first position, the product units are pushed onto the fingers while the product units engage the belt. The product units are pushed by a bar extending across the belt. The bar is advanced toward the fingers at approximately the same speed as the belt while the bar engages a product unit on the belt. The bar is advanced to a point where the product units have been pushed onto the fingers. The bar is driven to a location above the belt and substantially aligned with the first position after the bar has pushed the product units onto the fingers so that while the product units are advancing through the first position on the belt, they pass unhindered through the first position. The belt descends to the first position immediately after the product units have passed the first position so that the bar engages and pushes the product units substantially immediately after the bar has descended.

In a preferred embodiment, the dispensing means includes a hopper for holding the batter. The hopper includes an aperture through which the batter can flow by gravity onto the belt. The aperture is normally closed and is selectively opened. A pressurized inverting measuring cup is moved in the hopper and cooperates with opening and closing of the aperture so that: (a) a measured amount of batter is positioned in a substantially closed cavity formed by the cup over the aperture while the cup is stationary and prior to the aperture being opened, (b) batter in the cavity falls through the aperture while the aperture is open, whereby the batter falls through the aperture by gravity and in response to pressure applied to the measuring cup, and (c) after the aperture has been closed, the cup is moved in the hopper to capture the measured amount of batter. The cycle is then repeated in synchronism with advancement of the belt.

This particular dispensing means can be used for other types of machines for cooking batter products, such as pancakes. The dispencer is not limited to machines that include a continuously advanced, continuous conveyor belt. In addition, the dispensing means can be used with devices for cooking batter products, wherein the dispensing means and flipping means are synchronized with each other by a means other than a means responsive to the continuous belt advancement.

In the preferred embodiment, the hopper includes N of the cups, N of the aperture opening and closing means, and N of the apertures at different transverse locations across the belt, where N is an integer greater than 1. Such an arragement enables very high throughput to be provided by enabling plural product units to be simultaneously dispensed from the hopper onto the belt to form N parallel rows of product units. To form product units of differing sizes, e.g., pancakes having different diameters, the N aperture opening and closing means are individually adjustable to simultaneously have apertures of differing sizes so that differing amounts of batter can fall through different ones of the apertures while the apertures are open and the cups are stationary. To enable different types of product units to be simultaneously cooked, for example, to enable plain pancakes and blueberry pancakes to be simultaneously cooked, the hopper is partitioned into plural separate bins, each including at least one of the cups and one of the apertures. The partitions are arranged so that different batters can be put into the separate bins without being mixed.

In a preferred embodiment, each cup is vertically driven from a first position generally above the aperture associated therewith to a position covering the aperture, and thence back to the first position. The apertures are normally maintained closed and are selectively opened by a plate means for completely covering the aperture when it is closed. The plate means is driven so that at least a portion of the aperture is uncovered when the aperture is opened. Means are provided for controlling the extent of the aperture uncovered by the plate means when the aperture is opened to control: (a) the amount of batter dispensed through the aperture onto the belt each time the aperture is opened, and (b) the size of the product units formed on the belt.

It is, accordingly, still a further object of the invention to provide a new and improved batter dispenser.

A further object of the invention is to provide a new and improved batter dispenser wherein a measured amount of batter is dispensed cyclically to form product units of controlled size.

A further object of the invention is to provide a new and improved batter dispenser that is highly reliable, versatile and relatively inexpensive.

A further object of the invention is to provide a batter dispenser capable of holding different types of batter simultaneously and for dispensing the different types of batter simultaneously to enable different types of product units to be simultaneously formed on a receiver of the product units.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWING

FIGS. 1 and 2 are opposite side views of a machine for cooking batter products, such as pancakes, in accordance with a preferred embodiment of the invention;

FIG. 3 is a top view of the machine illustrated in FIGS. 1 and 2;

FIG. 4 is a top view of a portion of the heating pipes of the embodiment of the invention illustrated in FIGS. 1–3;

FIG. 5 is a partial cross-sectional view, taken through the lines 5—5, FIG. 3;

FIG. 6 is a partial cross-sectional view, taken through the lines 6—6, FIG. 3, of flipper fingers employed in the machine;

FIG. 7 is an end view of the machine illustrated in FIGS. 1–3, at the end where a dispensing hopper and idler drum are located;

FIG. 8 is a sectional view, taken through the line 8—8, FIG. 7, of the interior of a batter dispensing hopper and its relationship to a continuously advanced, longitudinally moving conveyor belt and the idler drum;

FIG. 9 is a perspective view of a wick for applying cooking oil to the continuously advanced, longitudinally moving conveyor belt;

FIG. 10 is a top view, partially in phantom, of details of the hopper for dispensing batter, in combination with the continuously advanced longitudinally moving conveyor belt;

FIG. 11 is a top view of details within the hopper illustrated in FIG. 10, to illustrate the manner in which batter is dispensed from the hopper;

FIG. 12 is a side-sectional view taken through the lines 12—12, FIG. 11, of the details of the dispensing structure;

FIG. 13 is a detailed side view of the end of the machine where the dispensing hopper and idler drum are located;

FIG. 13a is a view somewhat similar to that of FIG. 13, but illustrating a measuring cup in the hopper at the bottom of the hopper and the actuator therefor;

FIG. 13b is a top view of the structures illustrated in FIGS. 13 and 13a;

FIG. 15 is a side view of a portion of a linkage mechanism for activating the flipper mechanisms illustrated in FIGS. 14 and 14a;

FIG. 16 is a side view of a mechanism for pushing product units onto the flipper mechanism illustrated in FIG. 14;

FIGS. 16a and 16b are side views of the structure illustrated in FIG. 16, at different times during the pushing cycle;

FIG. 16c is an enlarged view of details of the pushing structure illustrated in FIG. 16;

FIG. 16d is a front view of the structure illustrated in FIG. 16c;

FIG. 16e is an enlarged view of details of the pushing structure on the side of the machine opposite from that illustrated in FIGS. 16, and 16a–16d;

DETAILED DESCRIPTION OF THE INVENTION

Figure 17:
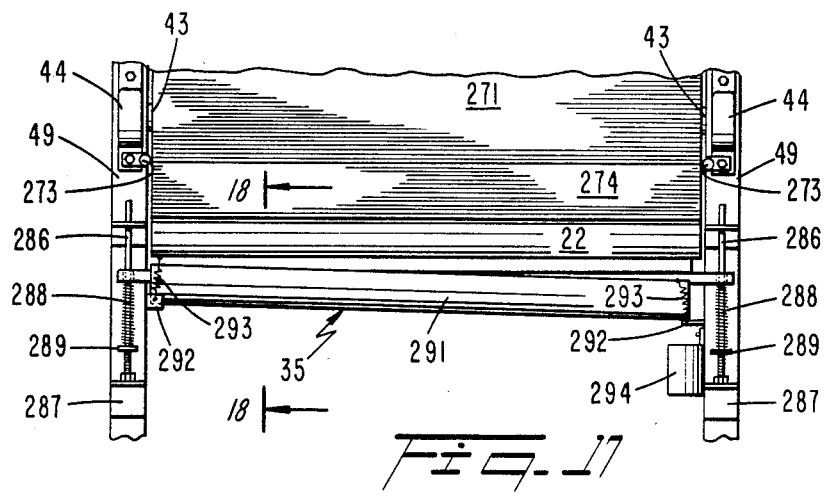
FIG. 17 is an end view of the driven drum at the end of the machine wherein cooked product units are removed.

Reference is now made to FIGS. 1–3 of the drawing wherein the preferred embodiment is illustrated as including continuously advanced metal, continuous cooking conveyor belt 21, of conventional design. Belt 21 is continuously translated between and paid around driven drum 22 and idler drum 23, at opposite ends of the belt. Heater assembly 24, preferably a source of flames resulting from ignition of gas from a suitable supply is positioned between drums 22 and 23 and the upper and lower rungs of belt 21. At the end of belt 21 adjacent idler drum 23 is batter dispensing station 25. Batter from station 25 is applied as individual, discrete units to drum 21, to form unitary products, such as pancakes or the like, on the upper face of the upper rung of belt 21 as the belt moves longitudinally between drums 23 and 22. At an intermediate location between drums 22 and 23 is flipping station 26 where the pancakes are flipped from one face to another. As the pancakes move from dispenser station 25 to flipper station 26, they are browned on a first face and cooked substantially in the interior thereof. As the pancakes advance from flipping station 26 toward driven drum 22, they are browned on the other face thereof and only slightly cooked. At driven drum 22 is take-off station 27 where the pancakes are removed from belt 21. The pancakes removed from belt 21 at take-off station 27 drop onto table 28, adjacent and below drum 22 and take-off station 27.

Dispenser 25 and flipper 26 are operated in synchronism with the forward movement of belt 21 in response to longitudinal translation of the belt between drum 23 and drum 22. To this end, linkages are provided between pegs 31 and 331 on opposite faces of idler drum 23 and activators at dispenser station 25 and flipper station 26. Because the activators at stations 25 and 26 are responsive to rotation of pegs 31 and 331, on the peripheries of opposite faces of idler drum 23 (rather than in response to the drive mechanism for drive belt 21) synchronism is achieved with the belt movement, despite slippage that I have found generally occurs between the drive mechanism for the belt and the belt. Since idler drum 23 is driven directly by belt 21, any slippage that the belt incurs is coupled to idler drum 23, thence to pegs 31 and 331 thereon and the mechanisms at stations 25 and 26, to achieve synchronism between the belt and the mechanisms.

To facilitate cooking of the batter applied to belt 21, the belt is greased with cooking oil. To this end, oil dispensing station 33 is located adjacent drum 23, immediately upstream of dispensing station 25. Thereby, when batter is applied from dispensing station 25 onto belt 21, there is a fresh supply of cooking oil on the belt to provide the necessary lubrication to prevent sticking of the batter to the belt and burning of the batter. The cooking oil and other scraps which might be on belt 21 after the finished products are removed at take-off station 27 are removed by the action of the take-off station, as well as by grease removing station 35, adjacent driven drum 22 and downstream of take-off station 27. Sometimes there is a tendency for excessive oil to be supplied to belt 21 by oil applicator station 33. The excessive oil has a tendency to drip around belt 21 and idler drum 23. To prevent such excess oil from dropping onto the ground below drum drum 23, oil catcher station 37 is provided immediately below idler drum 23.

Belt 21 and drum 22 are driven by electric motor 41, connected by belt, gear box and chain assembly 42 to drive shaft 43 of drum 22. Shaft 43 is mounted in bearing housings 44 located adjacent opposite faces of drum 22. Bearing housings 44 are mounted to compensate for expansion and contraction of belt 21 as a function of temperature so that constant tension is maintained on the belt as the belt undergoes temperature changes in response to the heat applied thereto by heater assembly 24. Bearing housings 44 are also mounted so that a tendency for belt 21 to walk or be skewed relative to the end faces of drums 22 and 23 is manually prevented.

The entire apparatus is carried by housing 47, mounted on casters 48. Housing 47 is a right parallelepiped constructed as an open frame including vertical beams 49 and horizontal beams 50.

Consideration is now given to details of dispenser 25 by reference to FIGS. 1, 2, 3, 7, 8, 10, 11, 12, 13, 13a and 13b. Dispenser 25 includes hopper 61, positioned across the entire width of belt 21, slightly downstream of the axis of idler drum 23. Hopper 61 is fixedly mounted to frame 47 and is shaped as a trough in cross-section, having a vertical front wall 59, horizontal base 62 and inclined rear wall 63, as well as an open top into which batter is poured. Several dispensing stations, across the width of hopper 61 and transverse to belt 21, are provided. In the preferred, illustrated embodiment, five dispensing stations 64 are provided. The dispensing stations 64 are separated from each other by vertically extending partitions 65 that extend between front face 59 and back face 63 of the hopper and down to base 62 of the hopper. Partitions 65 enable different types of batter to be inserted into different hopper stations 64 or enable some of the hopper stations to be effectively disabled if the full capacity of the machine is not necessary.

Within each separate dispensing station 64 is a vertically driven inverted measuring cup 66 and a circular aperture 67 in base 62. Aperture 67 is selectively opened and closed by plate 68, having opposite edges captured in slots formed between base 62 and flanges 401 that extend horizontally from plates 402, in turn secured to base 62. Each plate 68 is driven longitudinally of belt 21 in synchronism with the movement of each cup 66 so that when the cup is against base 62, aperture 67 is opened by circular aperture 71 in plate 68, enabling batter to flow through the aperture 71 in plate 68, thence onto belt 21. Aperture 67 is then closed by translating plate 68 to cover the aperture. Inverted cup 66 is then lifted, whereby additional batter flows into the region formally occupied by the inverted cup. The inverted cup is then again driven against base 62 to form a batter containing chamber and the cycle is repeated. To provide air pressure against the batter in cup 66 and enable the batter to flow by gravity, so that a flow restriction suction is not created within the inverted cup, the cup is vented to the atmosphere by tube 69. Tube 69 is fixedly connected to and extends from the top of inverted cup 66 through the batter, above the top of hopper 61.

Circular aperture 71 of plate 68 has a diameter equal to that of circular aperture 67. When it is desired to make pancakes of maximum size, plate 68 is driven so that apertures 67 and 71 are concentric with each other when cup 66 is against base 62. If, however, it is desired to make pancakes having a smaller size, plate 68 is adjusted so that apertures 67 and 71 are off center with respect to each other when cup 66 bears against base 62.

The movements of cups 66 and plates 68 are synchronized with the longitudinal drive of belt 21. Cups 66 are driven upwardly and downwardly in response to rotation of pegs 331, on drum 23 by virtue of a first linkage connected between the pegs and cups. Plates 68 are longitudinally driven to cover and uncover apertures 67 in response to pegs 331 rotating and activating a clutch mechanism.

The linkage extending between pegs 31 and cups 66, to provide for the up and down motion of the cups, includes horizontally extending shaft 73 that is journaled to vertically extending posts 49 of frame 47. Shaft 73 is intermittently rocked back and forth each time one of pegs 331 on idler drum 23 engages vertically extending rod 74 of a linkage coupled to shaft 73. Rod 74 is pivotally mounted to plate 75 on cowling 76 for drum 23 by pin 77, which extends horizontally from the rod into a hearing of the plate. The upper end of rod 74 is pinned by stub shaft 78 to turn about one end of rod 79, the other end of which carries hook 81, in turn connected by tension spring 82 to horizontally extending beam 50, at the top of frame 47. The end of tension spring 82 remote from hook 81 is connected to beam 50 at the top of frame 47 by hook 83 which fits in an aperture of post 84 that downwardly depends from the beam. The end of rod 79 adjacent hook 81 is pinned to generally downwardly extending arm 85 by stub shaft 86. The end of arm 85 remote from rod 79 is fixedly connected to shaft 73, to rock the shaft back and forth each time rod 74 engages one of pegs 331.

Each inverted dispensing cup 66 is connected to shaft 73 by a guided crank mechanism. The guided crank mechanism includes crank shaft 88, having one end fixedly connected to shaft 73 and a second end pivotally connected to vertically extending rod 89 by wrist pin 91. The vertical position of cup 66 relative to pin 91 can be adjusted by any suitable means (e.g. dividing rod 89 into two parts that can be translated relative to each other) to provide adjustments necessary for the position of cup 66 when it forms a cavity with base 62. To constrain the motion of cup 66 relative to the direction of movement of belt 21, while allowing some transverse movement of the cup, rod 89 extends through guide hook 93, which is fixedly connected by stub 94 to rod 95 that extends transversely of belt 21 and is fixedly connected to vertically extending beams 49 in proximity to cowling 76. Hook 93 includes slot 96 into which rod 89 fits. Slot 96 is shaped to allow movement of rod 89 transversely of belt 21, while restricting the movement of rod 89 to a great extent in the direction of belt movement. When rod 74 is in a neutral position, between activation thereof by pegs 331 on idler drum 23, as illustrated in FIG. 13, cups 66 are lifted away from base 62 of hopper 61.

In response to one of pegs 331 engaging rod 74, as occurs in response to the peg advancing approximately 60° beyond the zenith thereof, the bottom end of rod 74 is pivoted forward, i.e., in the direction of movement of belt 21 from idler drum 23 to driven drum 22. As illustrated in FIG. 13A, pivoting of rod 74 forward results in rod 79 being drawn rearwardly, against the tension of spring 82. Rod 85 thereupon rotates backwardly, i.e. in a counter clockwise direction, as illustrated in FIG. 13A, about shaft 73. Shaft 88 also rotates downwardly, i.e., in a counter clockwise direction, about shaft 73. Shaft 89 in turn turns counter clockwise about wrist pin 90, so that shaft 89 is in a vertical position to drive cup 66 against base 62. Cup 66 bears against base 62 until peg 331 has advanced to approximately 90° beyond the zenith thereof at which time rod 74 is released from the peg. Rod 74 then returns to the vertical position illustrated in FIG. 13, to drive cup 66 quickly to the upward position illustrated in FIG. 13. Cup 66 stays at the position illustrated in FIG. 13 until the next peg contacts rod 74, at which time cup 66 is again driven downwardly to contact base 62.

Figure 12A:
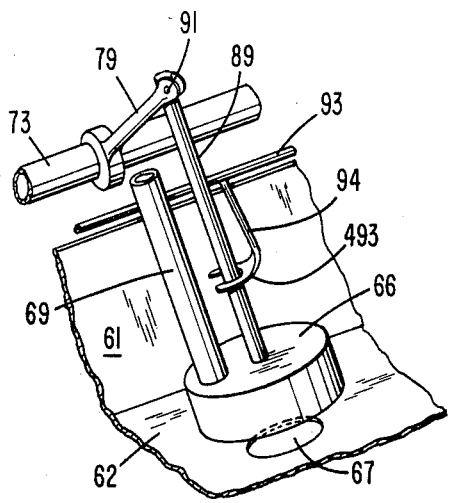
FIG. 12a is a perspective view of one inverted measuring cup, a portion of the drive mechanism for the cup, and a portion of the hopper where the cup is located.

Plates 68 are driven in synchronism with cups 66 so that when the cups bear against base 62, plate 68 uncovers apertures 67 and base 62 of hopper 61. To these ends, plates 62 are driven by motor 41 via drive train 93 (FIG. 2) and clutch 94 which is engaged in response to linkage 95 contacting one of pegs 331. In response to clutch 94 being engaged, linkage 96 is activated to push plate 68 rearwardly, i.e., in a direction opposite to the forward motion of belt 21 between idler drum 23 and driven drum 22. When clutch 94 is disengaged, linkage 96 returns to its initial position whereby plates 68 are driven forward. As illustrated in FIG. 12, plate 68 is captured in slots formed between opposing faces of plates 62 and 401; plate 401 extends horizontally as a flange from plate 402 that is fixed to plate 62.

As illustrated in FIG. 7, drive mechanism 93 includes belt 101 that extends from pulley 102 of motor 41 to pulley 103 of reduction gear box 104 having an output shaft which drives a sprocket, in turn connected to chain 105. Chain 105 drives a sprocket connected to an input shaft of clutch 94. Clutch 94 is engaged in response to generally horizontally extending rod 106, which is a part of linkage 95 and extends along the bottom of frame 47, being driven forward, i.e., from left to right, as illustrated in FIG. 2. Rod 106 is pinned to vertically extending rod 107 by pin 108. Rod 107 extends in front of pegs 31, i.e., to the left of pegs 31, as illustrated in FIG. 2. One of pegs 331 engages rod 107 slightly after a different one of pegs 331 engages rod 74, so that rods 74 and 107 are driven forward in synchronism.

In response to rod 107 being driven forward, causing clutch 31 to be engaged, linkage 96 is activated. Linkage 96 includes vertically extending rod 109, reciprocally driven by an output cog (not shown) of clutch 94 in response to the clutch being engaged by shaft 106. Rod 109 is driven upwardly in response to clutch 94 being engaged by rod 106; rod 109 returns downwardly, to the initial position thereof, in response to continued engagement of the clutch by rod 106. Clutch 94 and the relationship between rod 107 and pegs 331 are such that rod 109 is driven upwardly immediately after cup 66 has been driven against base 62. Rod 109 is driven downwardly immediately prior to cup 66 being returned to its upward position illustrated in FIG. 13. Thereby a cavity is formed between the interior of inverted cups 66 and base 62 immediately before plates 68 uncover apertures 7.

Linkage 96, in addition to and including rod 109, includes horizontally extending rod 111, connected to vertically extending rod 109 by shafts 112 and 113. Rod 109 is connected to shaft 113 by wrist pin 114. An end of shaft 113 opposite from wrist pin 114 is fixedly connected to an end of shaft 112. One end of rod 111 is pivotedly connected by pin 115 to an intermediate point on shaft 112. The vertical extent of rod 109 is controlled and varied by providing the upper end of the rod with a threaded bore which receives threaded shaft 116, held in place by nut 117.

The end of rod 111 opposite from the end connected by pin 115 to rod 112 is connected to drive mechanism 120, FIG. 10, for plates 68. Drive mechanism 120 includes shaft 121 which extends transversely of belt 21 and is connected into one of four slots 122 (FIGS. 2 and 14) on plate 123 at the end of rod 111. Slots 122 are longitudinally located relative to forward movement of belt 21 to provide coarse adjustment of the position of the apertures in plates 68 relative to apertures 67 in base 62. The coarse adjustment is provided by positioning rod 121 in one of slots 122.

Rod 121 extends through bores at the lower ends of shafts 125 and 126 (FIGS. 1, 2, 3 and 10), at opposite edges of belt 21. Shafts 125 and 126 extend vertically, above the top of horizontally extending beam 50 at the top of frame 47, where the shafts include apertures through which shaft 127 extends. Shaft 127 is connected to bearings 128, on horizontal beams 50 at the top of the machine; bearings 128 are slightly beyond the edges of belt 21. Bearing 128, on the side of the machine where plate 123 is located, captures one end of generally horizontally extending finger 129, the other end of which includes an aperture into which the upper end of vertically extending rod 131 is pinned for turning. The lower end of rod 131 is pinned to hole 135 in plate 123, between the right most slot 122, as viewed in FIG. 2, and rod 111.

Shafts 121, 125, 126 and 127 thus form a relatively rigid rectangular frame which rotates about bearings 128 for controlling the movement of U-shaped rod 132 that simultaneously drives plates 68. Rod 132 includes longitudinally extending portions 133 and 134 which extend slightly outside of belt 21 from shaft 121 to transverse portion 135 to which plates 68 are fixedly connected. The ends of longitudinally extending portions 133 and 134 of rod 132 remote from hopper 61 are flattened. The flattened ends of rod portions 133 and 134 include apertures through which shaft 121 extends. The flattened ends of rod portions 133 and 134 are held in place by having opposite faces that abut against shafts 125 and 126 and against nuts 137.

The transverse extending portion 135 of rod 132 is fixedly secured to leg 141 (FIG. 10) so that the leg is driven longitudinally with respect to belt 21 in response to longitudinal movement of drive assembly 120. Leg 141 is shaped similarly to an angle iron, including horizontal and vertical portions 142 and 143 (FIGS. 8 and 13) which extend completely across belt 21. The ends of portions 142 and 143 of leg 141 are connected to each other by ears 144 (FIG. 10), having apertures through which rod portion 135 extends.

Plates 68 are equally spaced across the length of leg 141 and are secured to the leg by nut and bolt assemblies 145 that fit through mating apertures in upwardly extending tabs 146 of plates 68 and in upwardly extending wall portion 143 of leg 141. Each of plates 68 includes a circular opening 71, having the same diameter as opening 67 in base 62 of hopper 61. When openings 67 are opened by longitudinal movement of plates 68 they have overlapping areas with openings 71. The amount of overlap is controlled for each opening individually by adjusting nut and bolt assemblies 145. Thereby, if pancakes having the maximum size are desired in a particular longitudinal row of the machine, the centers of holes 67 and 71 coincide, by proper adjustment of nut and bolt assemblies. If, however, it is desired to have pancake of a smaller size in a particular row, the nut and bolt assembly 145 and the longitudinal position of plate 68 for that particular row are adjusted so that there is not a complete overlap between openings 67 and 71 when opening 67 is uncovered by longitudinal movement of the plates 68.

As indicated supra, coarse control for the simultaneous movement of plates 68 is provided by shaft 121 and slots 122. Fine control for the simultaneous movement of plates 68 relative to openings 67 is provided by lever 149, pivoted to shaft 121 outside of shaft 126. Turning of lever 149 causes tension to be exerted on shaft 121, to draw portion 134 of rod 132 back and forth.

Dispenser 25 can be deactivated at will by turning lever 150, connected to shaft 127 outside of shaft 126. Turning lever 150 raises and lowers shafts 125 and 126, enabling shaft 121 to be disconnected from one of slots 122 where it is normally captured. Turning of lever 150 also enables shaft 121 to be positioned into different ones of slots 122 to provide coarse adjustment for the positions of plates 68.

Consideration is now given to details of flipper mechanism 26 which is activated in synchronism with longitudinal movement of belt 21 and operation of dispensing of batter from dispensing station 25 onto belt 21. Flipping mechanism 26 is divided into pushing section 161 and flipping section 162 FIGS. 1, 2, 3, and 16). Pushing section 161, upstream of flipper section 162 relative to the movement of belt 21, pushes pancakes which have been cooked on one side onto fingers of flipping section 162. After the partially cooked pancakes have been pushed by pushing section 162 onto the fingers of flipper section 162, the flipper section is activated to turn the pancakes from one face to the other.

Pushing section 161 includes bar 164 which extends between the edges of belt 21 and has a "V" shape in cross section as illustrated in FIG. 1, 2, 16, 16A and 16B. Bar 164 includes legs 165 and 166 which are joined, and are at mutually right angles, to each other. The edge of leg 165 remote from leg 166 selectively bears against and is pushed with, i.e., at the same speed as, belt 21 to push pancakes across the width of the belt onto the fingers of flipper section 162. The lower ends of rods 169 and 170 are pivotally connected to opposite edges of leg 166. The upper ends of rods 169 and 170 are pivotally mounted to longitudinally extending beams 50 at the top of frame 47 by virtue of the upper ends of the rods being fixedly secured to rod 175 that extends transversely of belt 21, between upper beams 50 of frame 47.

Bar 164 is driven back and forth relative to drums 22 and 23 and rocked about rod 167 in response to linkage 181 being driven by one of pegs 31 (FIG. 1). Linkage 181 includes horizontally extending drive rod 182, pinned to the upper end of generally vertically extending rod 183, so that rod 183 is turned about the pin in response to longitudinal translation of rod 182. To provide a counter balancing force to the force provided by rod 182, a point on rod 183 slightly below the point where 183 is pinned to rod 182 is fixedly connected to one end of longitudinally extending tension spring 184, the other end of which is connected to one of beams 50 at the top of frame 47 by post 185 that downwardly depends from the frame beam. A center portion of rod 183 pivots about pin 186, fixedly connected to post 187 that downwardly depends from top frame beam 50.

The lower end of rod 183 is pivotally connected by pin 192 to one end of rod 193, that extends generally horizontally and longitudinally of belt 21. The other end of rod 193 is pivotally connected by pin 194 to one end of stub shaft 195. The other end of stub shaft 195 is fixedly connected to pin 196 (FIGS. 16C and 16D) that fits through a hole in rod 170 and is fixedly connected to the end of leg 166 of bar 164 which is closest to dispenser station 125. The other end of leg 166 is pivotally connected to rod 169 by virtue of the bottom of the rod being bent to extend through collar 200 (FIG. 16E), fixedly mounted on leg 166.

To control the rocking motion of bar 164, as well as the longitudinal translation of the rocking bar, stops 197 and 198 are respectively provided. Stop 197 (FIGS. 16C and 16D) is fixedly mounted on and extends outwardly from leg 166 of bar 164, to a region slightly above pin 196, between rod 170 and leg 166. Stop 197 engages rod 170 when bar 164 reaches the uppermost position thereof as the bar rotates counter clockwise about pin 196, as illustrated in FIGS. 16A and 16B. Stop 198 is shaped as a channel iron on plate 199 that is located immediately below belt 21 and which extends between vertically extending frame beams 49. Stop 198 includes a vertically extending flange 201 that is positioned on a line slightly behind the projection of shaft 175 on belt 21, i.e., between shaft 175 and dispensing station 125. When bar 164 is fully withdrawn toward dispensing station 25, leg 166 thereof engages flange 201.

As illustrated in FIGS. 16, 16A and 16B, stub shaft 189 on bar 183 and bracket 91, in combination with bolt 92 on vertically extending rod 170, limit the counter clockwise motion of rod 170 to maintain the rod in the vertical position when bar 164 is returned to the normal position thereof, in closest proximity to hopper 25. This is because bolt 192 comes into contact with the bottom portion of stub shaft 189 when rod 170 is in the vertical position, as illustrated in FIG. 16.

Bar 164 is designed, balanced and mounted on stub shafts 167 and 196 in such a way as to cause the intersection of legs 165 and 166 to be normally in an upper position as illustrated in FIG. 16. The relationship of rods 170, 183, 193 and shaft 95 is such that the downwardly facing edges of legs 165 and 166 of bar 164 are removed from belt 21. Thereby the pancake product masses on belt 21 are free to pass beneath bar 164. Soon after the individual pancake masses on belt 21 have passed bar 164 toward flipper fingers 162, push bar 182 is activated and pulled toward hopper 25. In response to push bar 182 being drawn toward hopper 25, rod 183 pivots in a clockwise direction, as illustrated in FIGS. 16, 16A and 16B, about fixed pin 186. In response to bar 183 pivoting about pin 186, rods 193 and 120 respectively pivot about pins 192 and 175. Because the longitudinal separation between pins 175 and 180 increases in response to rod 182 being driven toward hopper 25, the longitudinal separation between pins 194 and 196 decreases causing stub shaft 195 to turn downwardly, in a counter clockwise direction, about pin 194. Counter clockwise turning of stub shaft 195 about pin 194 causes counter clockwise rotation of the end of leg 166 to which pin 196 is attached. In consequence, the edge of leg 165 rotates in a counter clockwise direction until it contacts belt 21. The bottom edge of leg 165 contacts belt 21 slightly before pancake P engages any portion of flipper fingers 162. Bar 164 then basically translates along belt 21 at the same speed as the belt in response to drive rod 182 being driven at the same speed as the belt. Drive rod 182 continues to be translated until pancake P has been pushed by leg 165 onto flipper fingers 162.

Immediately after leg 165 had pushed pancake P onto flipper fingers 162, the peg 331 on drum 23 to which pusher rod 182 was engaged advances to a point where rod 182 becomes disengaged. In response to pusher rod 182 being disengaged, tension spring 184 pulls on rod 183, causing the rod to pivot in a counter clockwise direction about pin 186, as illustrated in FIG. 16B. Turning of rod 183 about pin 186 causes translation of rod 183 toward the initial position thereof, as illustrated in FIG. 16, in turn resulting in counter clockwise turning of rods 170 and 193. The counter clockwise turning of rods 170 and 193 causes bar 164 to be lifted above belt 21 and drives the bar to the initial position illustrated in FIG. 16. The cycle of operations is repeated when the next pancake has passed beneath and slightly forward of bar 164.

Figure 15:
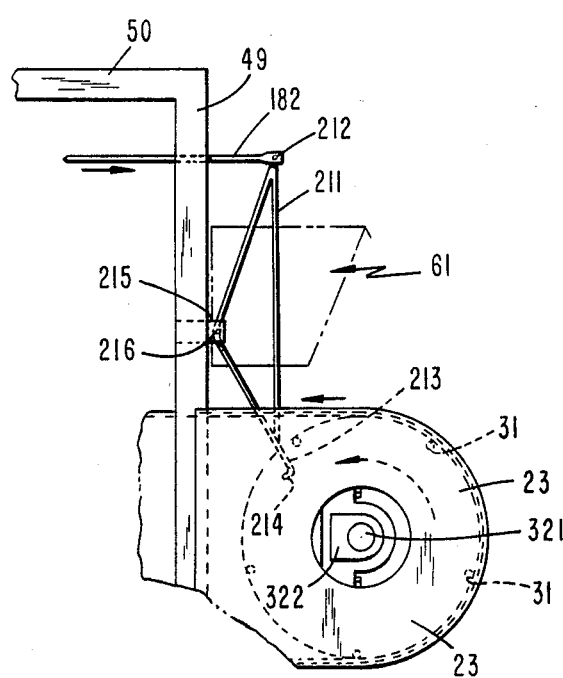
Figure 15A:
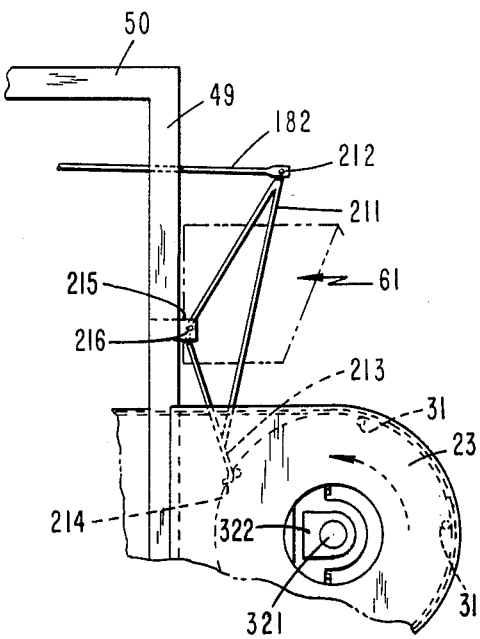
FIG. 15a is a side view, partially in phantom, of the apparatus illustrated in FIG. 15, but in a position wherein the linkages are activated by a peg on the idler drum.

Push rod 182 is intermittently pulled toward drum 23 in synchronism with the movement of belt 21 and with the dispensing of batter from dispenser 25 onto the belt in response to pegs 31 on idler drum 23 engaging vertically disposed, triangular arm 211, FIGS. 15 and 15A. The upper corner of arm 211 is pivotally connected by pin 212 to an end of push rod 182 remote from linkage 161. Extending from the lower corner of triangular arm 211 is generally downwardly depending leg 213, having foot 214 at the end thereof. The apex of triangular arm 211 is pinned to flange 215 which horizontally extends from the vertically extending frame beam 49 on the side of frame 47 closest to pegs 31. The hypotenuse of arm 211 normally downwardly depends from pin 212 so that leg 213 extends below the hypotenuse and is displaced from the vertical by about 30°. Idler drum 23 is driven by belt 21 in a counter clockwise direction, causing one of pegs 31 to contact leg 213 and drive arm 211 in a clockwise direction. Clockwise turning of arm 211 results in rod 182 being pulled toward idler drum 23 and slightly downwardly as the arm moves horizontally. The clockwise turning of arm 211 continues until peg 31 passes below foot 214, at which time arm 211 is released and rod 182 is pulled toward driven drum 22 by the tension exerted on rod 183 by spring 184. Because of foot 214 at the end of leg 213, there is a relatively smooth, noiseless release of arm 211 from the influence of peg 31.

Consideration is now given to flipper fingers section 162 and linkage 221 which drives it in response to rotation of pegs 331 on idler drum 23 activating clutch 94; the mechanism is best illustrated in FIGS. 2, 3, 6, 14 and 14A. Flipper assembly 162 comprises numerous individual and discrete metal leaf spring fingers 223, disposed in a side by side relationship across the width of belt 21, virtually from one edge of the belt to the other edge of the belt. Fingers 223 are self spring biased against belt 21, across the width of the belt despite the tendency for the belt not to be flat and planar at the intermediate position along the belt where flipper assembly 162 is located. The spring bias of flipper fingers 223 and the drive mechanism therefor enable free ends 224 of the fingers to bear against belt 21 completely across the width of the belt, between the edges thereof. The other ends of flipper fingers 223 are fixedly mounted to one face of relatively flat, narrow, elongated plate 225. Opposite ends of plate 225 are fixedly connected to stub shafts 226 and 227. Stub shaft 226 is journaled in bearing 228 which is fixedly connected to plate 199 that is directly beneath belt 21.

Stub shaft 227 is intermittently driven by linkage 221 in synchronism with movement of belt 21, activation of bar 164 and activation of the mechanism in dispenser 25. In particular, linkage 221 includes rod 231, pivotally mounted to the end of rod 112, in turn fixedly connected to rod 113, pinned to vertically extending rod 109 that is intermittently driven by clutch 94. As discussed supra, clutch 94 is engaged by rod 106 when rod 107 engages one of pegs 331. Thereby, shaft 231 is driven simultaneously with and by the same mechanism that drives plate 123 which drives inverted cup 66 and plate 68.

One end of rod 231 is pivotally connected to the end of rod 112 remote from rod 113 by pin 232. The other end of rod 231 is pivotally connected to plate 233 by pin 234. The effective length of rod 231 between pins 232 and 234 can be adjusted by dividing the rod into two portions and providing appropriate threads and nuts. The end of bar 233 remote from pin 234 is fixedly connected to stub shaft 227 so that the stub shaft and plate 225 connected thereto are rocked back and forth.

Figure 14:
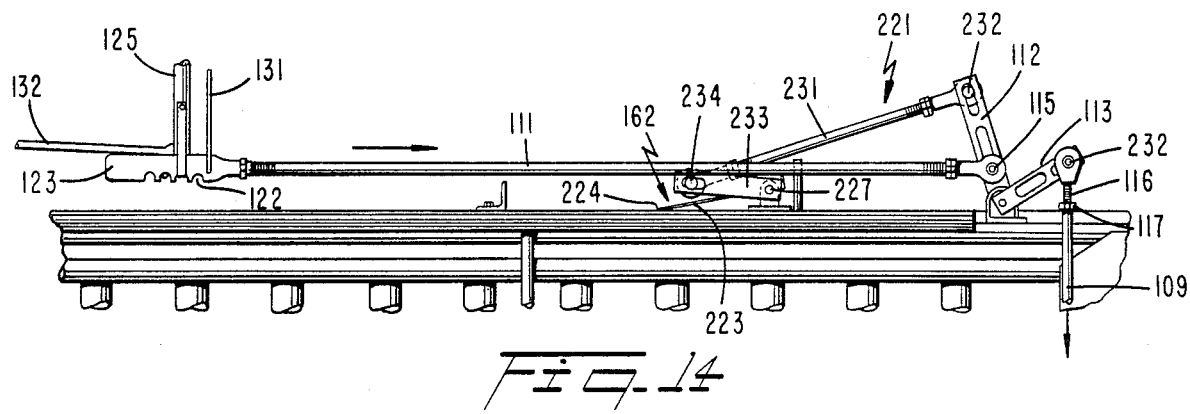
FIG. 14 is side view of details of a flipping mechanism utilized in the machine of FIGS. 1–3.

In the normal position, when rod 107 is not engaged by any of the pegs 331, plate 225 and finger ends 224 are positioned so that they point toward dispenser 25 and engage belt 21, as illustrated in FIGS. 14, 16 and 16A. In this position, fingers 223 depend downwardly by a slight angle from the axes of stud shafts 226 and 227 which are positioned slightly above belt 21.

Figure 14A:
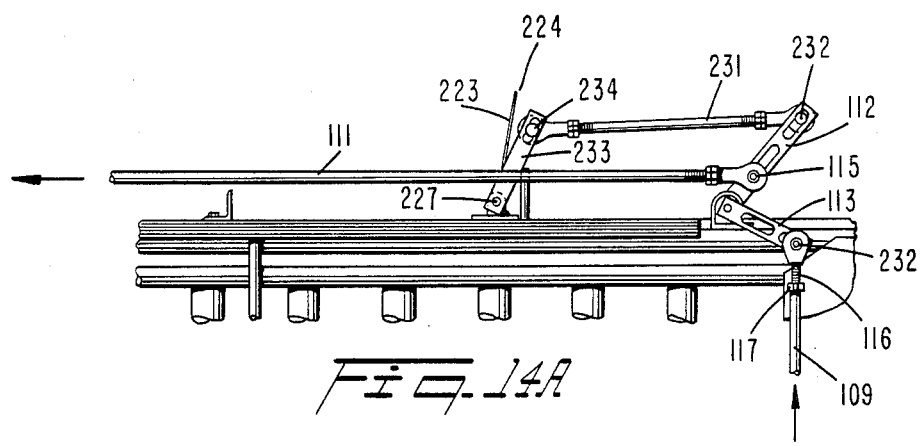
FIG. 14a is a view similar to that of FIG. 14, but of the flipper mechanism in an activated position.

In response to clutch 94 being engaged, rod 109 is driven upwardly, causing rods 112 and 113 to rotate in a clockwise direction, as illustrated in FIGS. 14 and 14A, from the position illustrated in FIG. 14 to the position illustrated in FIG. 14A. Turning of rod 112 in a clockwise direction to the position illustrated in FIG. 14A causes a like rotation of rod 231 and of plate 233, about stub shaft 227. In consequence, flipper fingers 223 are raised from the position illustrated in FIGS. 6, 14, 16 and 16A, to the position illustrated in FIGS. 14A and 16B. In the raised position, fingers 223 are beyond the vertical so that the upwardly directed faces of the fingers on which pancakes P were originally pushed are downwardly facing. Ends 224 of fingers 223 are typically driven from about 15° below the horizontal to approximately 15° beyond the vertical. I have found that the pancakes on fingers 223 fly off of the fingers and drop on to belt 21, with reliable flipping action of the pancakes being provided.

As described supra, rod 109 is driven back to the initial position thereof while clutch 94 is engaged. Thereby, flipper fingers 223 are positively driven back into engagement with belt 21. Assembly 221, including plates 112, 233, and rod 231, assists in providing the correct tension for the ends of fingers 223 against belt 21. The length of rod 231 is adjusted to provide the desired tension to fingers 223. The eccentric drive formed by rod 231, pin 234 and plate 223 for plate 225 has been found to provide accurate adjustment for the positions of the free ends 224 of flipper fingers against belt 21.

To limit the upward movement of flipper fingers 223, vertically extending stop 235 extends from plate 199. When plate 233 has been driven to its zenith, the leading edge of the plate engages stop 235 to prevent excessive downward motion of fingers 223. I found if excessive downward motion of fingers 223 is not prevented, proper flipping does not occur in many cases and there is a tendency for the pancakes to land in an unstable position, where they may not come properly to rest; proper resting occurs when the previously uncooked side is in the downward position on belt 21 in the same position on belt 21 as where the batter was originally dispensed.

Consideration is now given to heating assembly 24, best illustrated in FIGS. 1–5. Heating assembly 24 is responsive to liquid petroleum gas stored in a tank (not shown). Heating assembly 24 includes ten gas drives 242 longitudinally displaced along the length of belt 21 and extending transversely of the belt. Lines 242 are supplied with liquid petroleum fuel by hand operated valve 241 and manifold 243. Lines 242 are connected to longitudinally extending burner pipes 244, located between the upper and lower rungs of belt 21, at different transverse positions of the belt. Gas jets in pipes 244 are located slightly below the lower face of metal plate 409. The upper face of plate 409 is directly beneath the lower face of the upper rung of belt 21. Heat is thereby uniformly transferred from the gas jet flames to belt 21 between dispenser 25 and a location halfway between fingers 223 and drum 22. Conventional igniter 245 is provided for gas pipes 244. The gas in flame pipes 244 is ignited by a pilot light that is provided by transversely extending tube 243. Gas pipes 244 are arranged so that most of the heat that they apply to belt 21 is applied between dispenser 25 and flipping finger assembly 162. Thereby, the pancakes are primarily cooked and browned on one side as they traverse between dispensing station 25 and flipper finger assembly 162 and are primarily browned on the other side after they have been flipped by assembly 162.

To these ends, gas burner pipes 244 and plate 409 are disposed longitudinally below the upper rung of belt 21 between the forward vertical wall of hopper 61 and a position approximately half way between flipper finger assembly 162 and driven drum 22. Flipper finger assembly 162 is positioned so that it is located approximately half way between the center line of the length of each of pipes 244 and the ends of the pipes closest to driven drum 22.

To minimize the escape of heat from the region between the upper and lower rungs of belt 221, a layer of thermal insulation 251 is mounted on plate 252 that extends between drums 22 and 23. Insulation layer 251 and plate 252 are immediately below the bottom rung of belt 21. Insulating layer 251 assists in keeping belt 21 warm while it travels from driven roller 22, at the output end of the machine, back to idler drum 23, at the input end of the machine. The insulation helps to maintain belt 21 at a sufficiently high temperature so that when the belt passes dispensing station 25 the individual batter masses applied to the belt begin to be cooked immediately.

Additional heat is supplied to belt 21 as it passes over idler drum 23, immediately prior to the belt passing beneath dispensing station 25. To this end, gas burner pipe 255 is connected to the fuel tank by pipe 243 and mounted so that it extends transversely of belt 21, between the upper face of the lower rung of the belt and drum 23, just before the intersection of the belt as it is being paid onto the drum. Flames from pipe 255 are directed toward drum 23, with pipe 255 being only approximately a half an inch away from the drum. In addition, pipe 255 is in virtual contact with the upper face of the lower rung of belt 21 to supply heat directly to the belt, over the entire width of the belt. Because of the large thermal mass of drum 23, the drum becomes quite hot and stays hot in response to the flames from pipe 255. The large thermal mass of drum 23 adds a substantial amount of heat to belt 21 immediately prior to batter being supplied to the belt by dispensing station 25.

To prevent the pancakes from sticking to belt 21 and to lubricate the belt when it is not in use, the belt is supplied with cooking oil by wick assembly 33. As illustrated in FIG. 2, wick assembly 33 is responsive to cooking oil stored in tank 261, located in proximity to dispenser station 25 and mounted to frame 47. Conduit 262 extends from tank 261 to wick assembly 33, to supply the wick assembly with the necessary amount of cooking oil.

As illustrated in FIGS. 1, 2, 7, 8 and 9, wick assembly 33 includes horizontally extending pipe 263 that extends transversely of belt 21, above the belt and drum 23. A hand operated valve 265 is provided in alignment with each of dispensing stations 64 in hopper 61. Immediately below and extending to the side of each of valves 265, i.e., in a direction transverse to belt 21, is a separate wick 266. All of wicks 266 are mounted on shaft 267 that extends transversely of belt 21 and is journaled in bearings 268 (only one of which is shown) on arcuate shield 269 that is concentric with drum 23. Pipe 263 is also carried by shield 269. Extending from one end of shaft 267 is handle 471 which enables wicks 266 to be brought into and out of contact with belt 21 as the belt is leaving drum 23, on its way toward the location where batter is dropped onto the belt from hopper 61.

Valves 265 are opened so that a required amount of cooking oil continuously flows, in droplet form, from the valves onto wicks 266 so that oil drops from each valve onto the single wick located beneath the particular valve. The oil droplets dropping onto wick 266 spread throughout the wick. Wick 266 thus becomes saturated with oil, whereby oil from the wick is supplied to the portion of belt 21 which passes beneath the wick. Wick 266 has a length equal to the maximum diameter of the pancake to be formed on belt 21 by the dispenser station 64 that is associated with a particular wick. The center of each wick 266, as illustrated in FIG. 7, is aligned with the center of opening 68 in base 62 of hopper 61 for each dispensing station 64 in the hopper.

In normal operation handle 471 is turned so the free ends of wicks 266 bear against belt 21 so cooking oil is applied to the belt by virtue of a squeegee type action between the wicks and belt. Thereby, the entire area of belt 21 that receives batter from one of stations 64 is provided with oil. While the pancakes are being cooked, they remove sufficient heat from the belt to prevent overheating of wicks 266 by the belt.

To prevent wick 266 from possibly being burned by heat from belt 21 and drum 23 while the machine is in operation, but no pancakes are being cooked, handle 471 is turned so that the free ends of wick 266 are slightly above belt 21. Because wicks 266 are saturated, sufficient oil is supplied by the wicks, as droplets, to belt 21 to provide the desired lubrication for belt maintenance purposes. When the machine is not in use and it is desired to lubricate belt 21, as must be done from time to time even when the machine is not being used, handle 471 is turned so that wick 266 contacts belt 21. The machine is run for a few minutes, without heat, to provide the desired lubrication for belt 21. To enable wicks 266 to be replaced when they are worn, the wicks are selectively connected by suitable fasteners to shaft 287.

To prevent the pancakes from becoming saturated with cooking oil, and to remove other debris that may collect on belt 21, scrappers for the belt are provided as it is paid over driven drum 22 and idler drum 23. One of the scrapers on driven drum 22 also removes cooked pancakes from belt 21 and enables them to be supplied to manually activated turn table 28.

Doctor blade 271, FIGS. 1, 2, 3 and 18, removes pancakes from belt 21 and initially scrapes the belt as it passes over driven drum 22. One edge of doctor blade 271 abuts against and is tangent to belt 21 as the belt passes over driven drum 22 at the point where the drum is approximately 30° above the horizontal. The edge of doctor blade 271 that abuts and bears against belt 21 is spring biased into that position by tension spring 272, connected to the end of doctor blade that abuts against belt 21 and to vertically extending posts 49 of frame 47. The other end of doctor blade 271 is held in place and pivotally connected to horizontally extending bars 273, fixedly mounted on bearings 44 for shaft 43. Sheet metal skirt 274 is fixedly connected to bars 273, at the intersection between the bars and doctor blade 271. Skirt 274 is inclined at a smaller horizontal angle than doctor blade 271 so that the pancakes removed by doctor blade 271 from belt 21 land in a horizontal position on turn table 28.

Figure 18:
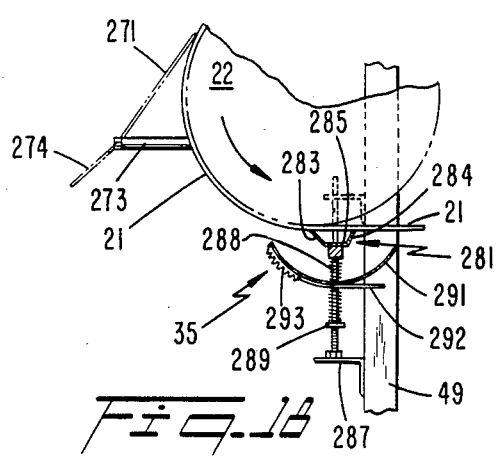
FIG. 18 is a side view, taken through the lines 18—18, of the driven drum and structures used to remove the cooked product units from it, as well as to remove grease from the continuously advanced, longitudinally driven conveyor belt.
Figure 19:
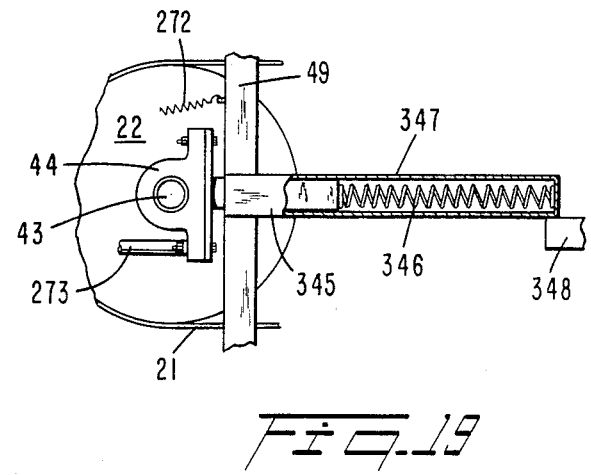
FIG. 19 is a side view of the driven drum and mechanisms associated therewith for maintaining the continuously advanced belt under substantially constant tension despite temperature variations thereof.
Figure 20:
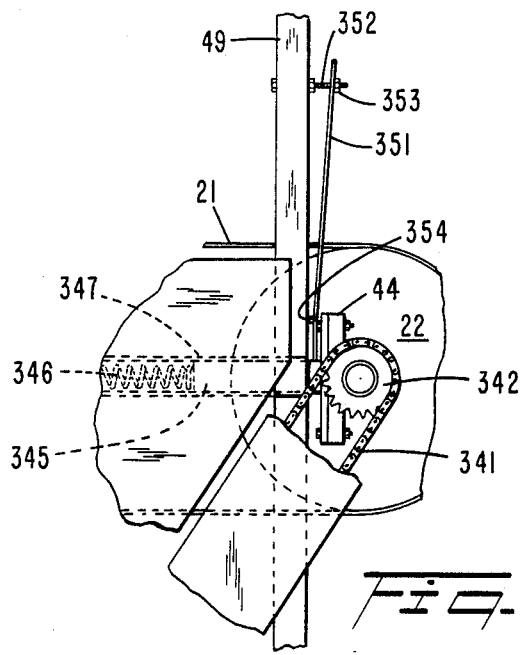
FIG. 20 is a detailed view, partially in phantom, of a drive mechanism for the driven drum, in combination with the temperature compensating mechanism illustrated in FIG. 19 and mechanism for preventing walking or skewing of the belt relative to edges of the drums.

After belt 21 has been initially scraped of pancakes, oil and other debris by doctor blade 271 at take-off station 27, the belt proceeds to grease removing station 35. As illustrated in FIGS. 1, 17 and 18, grease removing station 35 includes channel 281 having scrapping flanges or blades 283 and 284 which extend upwardly from base 285. Channel 281 extends transversely of belt 21, beyond the edges of the belt, to standards 286 to which the channel is connected. Standards 286 are fixedly mounted on flanges 287, in turn fixedly mounted on vertically extending posts 49 of frame 47. The edges of flanges 283 and 284 are spring biased against belt 21 by virtue of compression springs 288 being captured around standards 286, between base 285 of channel 281 and nuts 289 on threads of standard 286.

Flanges 283 and 284 respectively extend toward take-off area 27 and dispensing station 25. The edges of blades 283 and 284 engage belt 21 at a position where the belt is approximately horizontal. The edge of blade 283 that intersects belt 21 subtends a lower angle relative to the face of belt 21 than the edge of blade 284. I have found that this asymetrical relationship of the edges of blades 283 and 284 relative to belt 21 enables increased oil and other materials to be removed from belt 21.

The oil and other debris removed by scraper channel 281 from belt 21 flows into arcuately shaped trough 291 that is mounted directly beneath the channel and is inclined from one side of belt 21 to the other side of the belt, so that the trough is lower on one side of the belt than on the other side of the belt. Opposite ends of trough 291 are mounted by fingers 292 and tension springs 293 to vertically extending post 49. Fingers 292 and 293 project horizontally from post 49 toward the center of the machine and include slots for receiving one end of springs 293; the other ends of springs 293 are connected in holes at the edge of trough 291.

The debris which drops into trough 291 flows by gravity to the lower end of the trough. Fixedly positioned below the lower end of trough 291 is can 294, having an open top through which drops the oil and other debris that flows out of the lower end of trough 291. When can 294 becomes filled, it is removed from vertically extending post 49 on which the can is normally mounted.

Occasionally, excessive oil is supplied by wicking station 33 to belt 21, to cause oil to flow around the vicinity of idler drum 23. To prevent such excessive oil from dropping onto the ground below drum 23, oil catcher station 37 is provided immediately below idler drum 23. Catcher station 37, best illustrated in FIGS. 1, 2 and 7, includes trough 297 that extends between the edges of belt 21 and is inclined downwardly so that oil caught by the trough flows from the lowest, open end of the trough into can 298. Can 298 is fixedly mounted on vertically extending post 49 of frame 47. Trough 297 is located below the nadir of drum 23 so that excess oil which falls onto the drum drips into the trough and thence into can 298.

Consideration is now given to the manner in which drums 22 and 23 are mounted on frame 47. Idler drum 23 includes axle 321 to which the drum is secured. Axle 321 extends beyond the end faces of drum 23. The portions of axle 321 which extend beyond the end faces of drum 23 are mounted in bearing housings 322, fixedly connected by struts (not shown) to vertical posts 49. Thereby, axle 321 and drum 23 are fixedly positioned with respect to the remainder of frame 47 and are only free to rotate in bearing housing 322.

In contrast, both ends of axle or shaft 43 of driven roller 22 can translate together longitudinally relative to frame 47, to compensate for changes in length of belt 21, so that the belt tension remains constant between drums 22 and 23. In addition, one end of axle 43 can translate longitudinally relative to frame 47 and the other end of axle 43, to compensate for walking or skewing of belt 21.

The structure for controlling the position of axle 43 and for driving the axle is best illustrated in FIGS. 1, 2, 19, and 20.

Drive mechanism 42 for axle 43 includes chain 341 that extends between sprocket 342, fixedly secured to axle 43, and sprocket 343, fixedly connected to an output shaft of reduction gearbox 104. Reduction gear box 104 is driven by motor 41 by way of V belt 101, in turn connected to pulleys 102 and 103. Thus, there is a continuous forward drive between motor 41 and driven drum 22, to impart a continuous forward movement to continuous belt 21.

In response to belt 21 being heated by the flame from heater assembly 24, the belt length changes. Surprisingly, I found that the belt length decreases with increases in temperature thereof. To maintain the tension of belt 21 between drums 22 and 23 constant, without stretching the belt, the longitudinal positions of both ends of axle 43 are shifted together relative to the position of fixed axle 321. To these ends, bearing housings 44 for axle 43, at both ends of the axle, are fixedly mounted on horizontally extending rods 345 having a square cross-section. One end of each of rods 345 is fixedly connected to a vertically extending face of bearing housing 44, while the other end of rod 345 is fixedly connected to one end of compression spring 346. Rod 345 and compression spring 346 fit into sleeve 347, having a square cross-section which is slightly in excess of the cross-section of rod 345, to capture the rod and prevent rotary motion of the rod and bearing housing 44. The other end of spring 346 is fixedly connected to a vertical end face of sleeve 347. Sleeve 347 is fixedly mounted on horizontally extending plate 348, located between drums 22 and 23 and the upper and lower rungs of belt 21.

Compression spring 346 is made of a material having a negative temperature coefficient of expansion somewhat greater than that of belt 21 because the spring temperature is usually less than that of belt 21. Because of the proximity of sleeve 347 to heater assembly 24 and belt 21, the temperature of the sleeve and of spring 346 has a tendency to follow that of belt 21. Thereby, each of springs 346 expands and contracts with expansion and contraction of belt 21, in the same manner as the belt. Thereby there is longitudinal shifting of axle 43 relative to axle 321 as belt 21 expands and contracts, to enable the belt tension between drums 22 and 23 to remain constant.

It is necessary to maintain the position of shaft or axle 321 constant relative to frame 47 because movement of the shaft would result in inaccurate operation of the linkages for driving mechanisms in dispenser station 25 and flipper station 26. If there were relative movement between shaft 321 and pegs 31 and 331 on drum 23 relative to frame 47, the actuators for the linkages would not be contacted at the correct time and synchronism would be lost. For this reason, the axle position of drum 22, rather than drum 23, is controlled.

I have observed that there is a tendency for belt 21 to skew, i.e., walk toward one face of drum 22 and away from the other face of the drum. To prevent such skewing one of bearing housings 44 on one face of drum 22 is translated longitudinally of frame 47 relative to the bearing housing 44 on the other face of drum 22. Manual control for the longitudinal position of bearing housing 44 is provided by elongated lever 351, FIG. 20, having one end cantilevered to the top face of one tubes 347. The other end of lever 351 includes an aperture that fits over bolt 352, extending horizontally from post 49, to which the bolt is fixedly secured. Nut 353 is threaded on bolt 352 to limit the movement of lever 351 away from post 49. The side of lever 351 remote from post 49 bears against a vertical wall of bearing housing 44. Post 49 carries spring like tube 354, which engages the side of lever 351 closest to post 49 at a position slightly above the point where lever 351 engages the vertical wall of bearing housing 44. The position of nut 353 on bolt 352 determines the amount of force exerted by lever 351 on bearing housing 44, to control the longitudinal position of the bearing housing relative to frame 47. Thus, if the operator notices that belt 21 is walking or is skewed toward one face of drum 22, he merely turns nut 353 in the desired direction until belt 21 is again observed as being straight.

To keep the cooked pancakes hot, storage bin 361, having a closure (not shown), is fixedly mounted above belt 21, in proximity to take-off region 27. In the preferred embodiment, there is a shield (not shown) to prevent flames from escaping from the sides of the machine for safety purposes, and to provide better heat containment and transfer to belt 21.

The foregoing description and accompanying drawings relate to a preferred embodiment of the invention. Various modifications, additions, and substitutions which do not exceed the scope of the said invention may be made to suit particular cases and application, without affecting the principle of the invention which is only limited to the appended claims.

I claim:

1. Apparatus for automatically cooking products made of batter, such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream of the means for flipping and another side of each product unit is cooked on the belt downstream of the means for flipping, and means responsive to the continuous belt advancement for activating the dispensing means and the flipping means in synchronism with each other and longitudinal movement of the belt, the belt having a tendency to change dimensions as it changes temperature during cooking of the units, further including first and second drums over which the belt passes, the first and second drums being respectively located at the first and second ends of the belt, and means responsive to the temperature of the belt for changing the longitudinal separation of axes of the drums to compensate for the dimensional changes of the belt so the belt remains taut on the drum despite temperature changes of the belt.

2. Apparatus for automatically cooking products made of batter, such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream of the means for flipping and another side of each product unit is cooked on the belt downstream of the means for flipping, and means responsive to the continuous belt advancement for activating the dispensing means and the flipping means in synchronism with each other and longitudinal movement of the belt, a driven drum over which the belt is paid at one end of the belt and an idler drum over which the belt is paid at the other end of the belt, the means for activating including means responsive to rotation of the idler drum induced therein by the belt passing over it for controlling timing of the means for flipping, the means for activating including linkages coupled to and activated by pegs that rotate with and are driven by the idler drum, a first of the linkages being coupled between the pegs and an activator for the dispensing means and a second of the linkages being coupled between the pegs and an activator for the flipping means.

3. Apparatus for automatically cooking products made of batter, such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream of the means for flipping and another side of each product unit is cooked on the belt downstream of the means for flipping, and means responsive to the continuous belt advancement for activating the dispensing means and the flipping means in synchronism with each other and longitudinal movement of the belt, a driven drum over which the belt is paid at one end of the belt and an idler drum over which the belt is paid at the other end of the belt, the means for activating including means responsive to rotation of the idler drum induced therein by the belt passing over it for controlling timing of the means for flipping, the means for activating including linkages coupled to and activated by pegs that rotate with and are driven by the idler drum, a first of the linkages being coupled between the pegs and an activator for the dispensing means, a second of the linkages being coupled between the pegs and flipper fingers of the flipping means, and a third of the linkages being coupled between the pegs and means upstream of the flipper fingers for pushing the units onto the flipper fingers.

4. Apparatus for automatically cooking products made of batter, such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream of the means for flipping and another side of each product unit is cooked on the belt downstream of the means for flipping, and means responsive to the continuous belt advancement for activating the dispensing means and the flipping means in synchronism with each other and longitudinal movement of the belt, and means disposed upstream of the means for dispensing for applying cooking oil to the belt, the cooking oil applying means including wick means extending transversely of the belt.

5. The cooking apparatus of claim 4 further including means for selectively moving the wick means into and out of contact with the belt.

6. Apparatus for automatically cooking products made of batter, such a pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream of the means for flipping and another side of each product unit is cooked on the belt downstream of the means for flipping, and means responsive to the continuous belt advancement for activating the dispensing means and the flipping means in synchronism with each other and longitudinal movement of the belt, first and second drums over which the belt passes, the first and second drums being respectively located at the first and second ends of the belt, the means for heating including a heat source adjacent the first drum for heating the first drum, the heat source being in contact with the belt and interposed between the belt and first drum.

7. Apparatus for automatically cooking products made of batter, such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream of the means for flipping and another side of each product unit is cooked on the belt downstream of the means for flipping, and means responsive to the continuous belt advancement for activating the dispensing means and the flipping means in synchronism with each other and longitudinal movement of the belt, first and second drums over which the belt passes, the first and second drums being respectively located at the first and second ends of the belt, each drum having an axial shaft at each end thereof, the belt having a tendency to walk toward one end of a drum, and means for selectively longitudinally translating the shaft at one end of one drum relative to the shaft at the other end of said one drum to compensate for the walking tendency.

8. Apparatus for automatically cooking products made of batter, such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream of the means for flipping and another side of each product unit is cooked on the belt downstream of the means for flipping, and means responsive to the continuous belt advancement for activating the dispensing means and the flipping means in synchronism with each other and longitudinal movement of the belt, the flipping means including a plurality of spring fingers disposed across the width of the belt, means for turning said spring fingers together about a common axis above the belt, the spring fingers being dimensioned and arranged to enable an end of the spring fingers to be urged against the belt along a region extending substantially across the entire width of the belt despite the tendency of the belt to become curved in said region, the fingers being turned by said turning means from a first position where the finger ends are normally urged against the belt and point toward the dispensing means to a second position that is beyond the vertical and wherein the fingers point away from the dispensing means, the activating means turning the fingers about the axis from the first position toward the second position as the product units reach the fingers.

9. The cooking apparatus of claim 8 further including means immediately upstream of where the finger ends engage the belt while the fingers are in the first position for pushing the product units onto the fingers while the product units engage the belt.

10. The cooking apparatus of claim 9 wherein the pushing means includes a bar extending across the belt, the activating means including means for:
 (a) advancing the bar from a first position toward the fingers at approximately the same speed as the belt while the bar engages a product unit on the belt, the bar being advanced to a point where the product units have been pushed onto the fingers,
 (b) driving the bar to a location above the belt and substantially aligned with the first position after the bar has pushed the product unit onto the fingers so that while the product units are advancing through the first position on the belt they pass unhindered through the first position and
 (c) allowing the bar to descend to the first position immediately after the product units have passed the first position so that the bar engages and pushes the product units substantially immediately after the bar has descended.

11. Apparatus for automatically cooking products made of batter, such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream upstream of the means for flipping and another side of each product unit is cooked on the belt downstream of the means for flipping, and means responsive to the continuous belt advancement for activating the dispensing means and the flipping means in synchronism with each other and longitudinal movement of the belt, the dispensing means including a hopper for holding the batter, the hopper including an aperture through which the batter can flow by gravity, means for normally closing and for selectively opening the aperture, a pressurized inverted measuring cup, the activating means including means for moving the cup in the hopper and for driving the aperture closing and opening means so that:
 (a) a measured amount of the batter is positioned in a substantially closed cavity formed by the cup over the aperture prior to the aperture opening,
 (b) batter in the cavity falls through the aperture while the aperture is open and the cup is urged against a face of the hopper containing the aperture, the batter falling by gravity and in response to pressure applied to the measuring cup, and
 (c) after the aperture has closed, the cup is moved in the hopper to capture the measured amount of batter.

12. The cooking apparatus of claim 11 further including means forming a fluid flow passage extending from the interior of the cup through the batter in the hopper to the atmosphere to provide the pressure within the cup.

13. The cooking apparatus of claim 11 wherein the hopper includes N of said cups, N of said aperture opening and closing means, and N of said apertures at different transverse locations across the belt, where N is an integer greater than one, the activating means simultaneously driving the N means for moving the N cups and simultaneously driving the N aperture opening and closing means so that plural product units can be simultaneously dispensed from the hopper onto the belt, the N cups being moved at a time different from the N aperture opening and closing means.

14. The cooking apparatus of claim 13 wherein the N aperture opening and closing means are individually adjustable to simultaneously have apertures of differing sizes so that differing amounts of batter can fall through different ones of the apertures while the apertures are open and the cups are stationary to form product units of differing sizes.

15. The cooking apparatus of claim 11 further including means for partitioning the hopper into plural separate bins, each including at least one of said cups and one of said apertures so that different batters can be put into the separate bins without being mixed.

16. The cooking apparatus of claim 15 wherein the means for normally closing and for selectively opening includes plate means for completely covering the aperture when the aperture is closed and for uncovering at least a portion of the aperture when the aperture is open, and means for controlling the extent of the aperture uncovered by the plate means when the aperture is open to control:
(a) the amount of batter dispensed through the aperture onto the belt each time the aperture is open, and
(b) the size of the product units formed on the belt.

17. Apparatus for automatically cooking products made of batter, such as pancakes, comprising an elongated conveyor belt, means for dispensing individual masses of batter onto the belt to form individual units of the products adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream of the means for flipping and another side of each product unit is cooked on the belt downstream of the means for flipping, and means for activating the dispensing means and the flipping means in synchronism with each other, the dispensing means including a hopper for holding the batter, the hopper including an aperture through which the batter can flow by gravity, means for normally closing and for selectively opening the aperture, a pressurized inverted measuring cup coupled to the activating means, means for moving the cup in the hopper and for driving the aperture closing and opening means so that:
(a) a measured amount of the batter is positioned in a substantially closed cavity formed by the cup over the aperture prior to the aperture opening,
(b) batter in the cavity falls through the aperture while the aperture is open and the cup is urged against a face of the hopper containing the aperture the batter falling by gravity and in response to pressure applied to the measuring cup, and
(c) after the aperture has closed, the cup is moved in the hopper to capture the measured amount of batter.

18. The cooking apparatus of claim 17 further including means forming a fluid flow passage extending from the interior of the cup through the batter in the hopper to the atmosphere to provide the pressure within the cup.

19. The cooking apparatus of claim 17 wherein the hopper includes N of said cups, N of said aperture opening and closing means, and N of said apertures at different transverse locations across the belt, where N is an integer greater than one, the activating means simultaneously driving the N means for moving the N cups and for simultaneously driving the N aperture opening and closing means so that plural product units can be simultaneously dispensed from the hopper onto the belt, the N cups being moved at a time different from the N aperture opening and closing means.

20. The cooking apparatus of claim 19 wherein the N aperture opening and closing means are individually adjustable to simultaneously have apertures of differing sizes so that differing amounts of batter can fall through different ones of the apertures while the apertures are open and the cups are stationary to form product units of differing sizes.

21. The cooking apparatus of claim 17 further including means for partitioning the hopper into plural separate bins each including at least one of said cups and one of said apertures so that different batters can be put into the separate bins without being mixed.

22. The cooking apparatus of claim 21 wherein the means for normally closing and for selectively opening includes plate means for completely covering the aperture when the aperture is closed and for uncovering at least a portion of the aperture when the aperture is open, and means for controlling the extent of the aperture uncovered by the plate means when the aperture is open to control:
(a) the amount of batter dispensed through the aperture onto the belt each time the aperture is open, and
(b) the size of the product units formed on the belt.

23. Apparatus for dispensing batter comprising a hopper for holding the batter, the hopper including an aperture through which the batter can flow by gravity, means for normally closing and for selectively opening the aperture, a pressurized inverted measuring cup, means for moving the cup in the hopper and for driving the aperture closing and opening means so that:
(a) a measured amount of the batter is positioned in a substantially closed cavity formed by the cup over the aperture prior to the aperture opening,
(b) batter in the cavity falls through the aperture while the aperture is open and the cup is urged against a face of the hopper containing the aperture, the batter falling by gravity and in response to pressure applied to the measuring cup; and
(c) after the aperture closing the cup is moved in the hopper to capture the measured amount of batter.

24. The dispensing apparatus of claim 23 further including means forming a fluid flow passage extending from the interior of the cup through the batter in the hopper to the atmosphere to provide the pressure within the cup.

25. The dispensing apparatus of claim 23 wherein the hopper includes N of said cups, N of said aperture opening and closing means, and N of said apertures at different transverse locations across a product receiver, where N is an integer greater than one, the moving means simultaneously driving the N means for moving the N cups and the N aperture opening and closing means so that plural product units can be simultaneously dispensed from the hopper onto a product receiver.

26. The dispensing apparatus of claim 25 wherein the N aperture opening and closing means are individually adjustable to simultaneously have apertures of differing sizes so that differing amounts of batter can fall through different ones of the apertures while the apertures are open and the cups are stationary to form product units of differing sizes.

27. The dispensing apparatus of claim 23 further including means for partitioning the hopper into plural separate bins each including at least one of said cups and one of said apertures so that different batters can be put into the separate bins without being mixed.

28. The dispensing apparatus of claim 27 wherein the means for normally closing and for selectively opening includes plate means for completely covering the aperture when the aperture is closed and for uncovering at least a portion of the aperture when the aperture is open, and means for controlling the extent of the aperture uncovered by the plate means when the aperture is open to control:
  (a) the amount of batter dispensed through the aperture onto a product receiver each time the aperture is open, and
  (b) the size of the product units formed on the product receiver.

29. Apparatus for automatically cooking products made of batter such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, the belt having a tendency to change dimensions as its changes temperature during cooking of the units, first and second drums over which the belt passes, the first and second drums being respectively located at the first and second ends of the belt, and means responsive to the temperature of the belt for changing the longitudinal separation of axes of the drums to compensate for the dimensional changes of the belt so the belt remains taut on the drum despite temperature changes of the belt.

30. Apparatus for automatically cooking products made of batter such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, and wick means extending transversely of the belt and disposed upstream of the means for dispensing for applying cooking oil to the belt.

31. The cooking apparatus of claim 30 further including means for selectively moving the wick means into and out of contact with the belt.

32. Apparatus for automatically cooking products made of batter such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, first and second drums over which the belt passes, the first and second drums being respectively located at the first and second ends of the belt, the means for heating including a heat source adjacent the first drum for heating the first drum, the heat source being in contact with the belt and interposed between the belt and first drum.

33. Apparatus for automatically cooking products made of batter such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, first and second drums over which the belt passes, the first and second drums being respectively located at the first and second ends of the belt, each drum having an axial shaft at each end thereof, the belt having a tendency to walk toward one end of a drum, and means for selectively longitudinally translating the shaft at one end of one drum relative to the shaft at the other end of said one drum to compensate for the walking tendency.

34. Apparatus for automatically cooking products made of batter such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, means for flipping the individual product units as they arrive at an intermediate location along the belt length so that one side of each product unit is cooked on the belt upstream of the means for flipping and another side of each product unit is cooked on the belt downstream of the means for flipping, and means for activating the dispensing means and the flipping means in synchronism with each other and longitudinal movement of the belt, the flipping means including a plurality of spring fingers disposed across the width of the belt, means for turning said spring fingers together about a common axis above the belt, the spring fingers being dimensioned and arranged to enable an end of the spring fingers to be urged against the belt along a region extending substantially across the entire width of the belt despite the tendency of the belt to become curved in said region, the fingers being turned by said turning means from a first position where the finger ends are normally urged against the belt and point toward the dispensing means to a second position that is beyond the vertical and wherein the fingers point away from the dispensing means, the activating means turning the fingers about the axis from to first position toward the second position as the product units reach the fingers.

35. The cooking apparatus of claim 34 further including means immediately upstream of where the finger ends engage the belt while the fingers are in the first position for pushing the product units onto the fingers while the product units engage the belt.

36. The cooking apparatus of claim 35 wherein the pushing means includes a bar extending across the belt, the activating means including means for:

(a) advancing the bar from a first position toward the fingers at approximately the same speed as the belt while the bar engages a product unit on the belt, the bar being advanced to a point where the product units have been pushed onto the fingers, (b) driving the bar to a location above the belt and substantially aligned with the first position after the bar has pushed the product unit onto the fingers so that while the proudct units are advancing through the first position on the belt they pass unhindered through the first position and (c) allowing the bar to descend to the first position immediately after the product units have passed the first position so that the bar engages and pushes the product units substantially immediately after the bar has descended.

37. Apparatus for automatically cooking products made of batter such as pancakes, comprising a continuous, elongated, continuously advanced conveyor belt, means for dispensing individual masses of batter onto the belt to form individual product units adjacent one end of the belt, means for applying sufficient heat to the belt to cook the batter masses dispensed from the dispensing means onto the belt, the dispensing means including a hopper for holding the batter, the hopper including an aperture through which the batter can flow by gravity, means for normally closing and for selectively opening the aperture, a pressurized inverted measuring cup, means for moving the cup in the hopper and for driving the aperture closing and opening means so that:

(a) a measured amount of the batter is positioned in a substantially closed cavity formed by the cup over the aperture prior to the aperture opening, (b) batter in the cavity falls through the aperture while the aperture is open and the cup is urged against a face of the hopper containing the aperture, the batter falling by gravity and in response to pressure applied to the measuring cup, and (c) after the aperture has closed, the cup is moved in the hopper to capture the measured amount of batter.

* * * * *